US010925209B2

(12) United States Patent
Brechon

(10) Patent No.: US 10,925,209 B2
(45) Date of Patent: Feb. 23, 2021

(54) SYSTEM, APPARATUS AND METHOD FOR APPLYING ANHYDROUS AMMONIA (NH3) TO THE SOIL

(71) Applicant: Gerald A. Brechon, Dixon, IL (US)

(72) Inventor: Gerald A. Brechon, Dixon, IL (US)

(73) Assignee: Ag Automation, Inc., Dixon, IL (US)

( * ) Notice: Subject to any disclaimer, the term of this patent is extended or adjusted under 35 U.S.C. 154(b) by 264 days.

(21) Appl. No.: 15/818,516

(22) Filed: Nov. 20, 2017

(65) Prior Publication Data

US 2018/0139895 A1    May 24, 2018

Related U.S. Application Data

(60) Provisional application No. 62/424,968, filed on Nov. 21, 2016.

(51) Int. Cl.
| | |
|---|---|
| *A01C 23/02* | (2006.01) |
| *B05B 15/65* | (2018.01) |
| *A01C 23/00* | (2006.01) |
| *B05B 1/20* | (2006.01) |
| *B05B 1/30* | (2006.01) |
| *B05B 12/00* | (2018.01) |

(52) U.S. Cl.
CPC .......... *A01C 23/024* (2013.01); *A01C 23/007* (2013.01); *A01C 23/008* (2013.01); *B05B 1/20* (2013.01); *B05B 1/302* (2013.01); *B05B 12/006* (2013.01); *B05B 15/65* (2018.02)

(58) Field of Classification Search
CPC ..... A01C 23/024; A01C 23/023; A01C 23/02; A01C 23/00; A01C 23/007; A01C 23/008; B05B 15/65; B05B 15/60; B05B 15/00; B05B 1/20; B05B 1/14; B05B 1/00; B05B 1/302; B05B 1/3013; B05B 1/30; B05B 12/006; B05B 12/004; B05B 12/00

See application file for complete search history.

(56) References Cited

U.S. PATENT DOCUMENTS

| | | | |
|---|---|---|---|
| 3,339,843 A | 9/1967 | Horton | |
| 4,458,609 A | 7/1984 | Tofte | |
| 4,735,365 A | 4/1988 | Smeller | |
| 4,949,656 A * | 8/1990 | Lyle | A01C 5/062 |
| | | | 111/174 |
| 4,960,242 A | 10/1990 | Larson | |
| 5,598,708 A * | 2/1997 | Clark | F17C 7/02 |
| | | | 62/49.1 |
| 5,845,592 A | 12/1998 | Ridgley | |

(Continued)

FOREIGN PATENT DOCUMENTS

| | | |
|---|---|---|
| EP | 1844639 A1 | 10/2007 |
| EP | 3072376 A2 | 9/2016 |

(Continued)

OTHER PUBLICATIONS

U.S. Appl. No. 15/895,772, Brechon, filed Feb. 13, 2018.

*Primary Examiner* — Christopher J. Novosad
(74) *Attorney, Agent, or Firm* — Reinhart Boerner Van Deuren P.C.

(57) ABSTRACT

An applicator for applying anhydrous ammonia, NH3, to an agricultural field includes a distribution rail for receiving and out letting a flow of the NH3. The distribution rail has a decreasing inner diameter from an inlet of the distribution rail to distal ends of the distribution rail.

27 Claims, 15 Drawing Sheets

(56) References Cited

U.S. PATENT DOCUMENTS

| | | |
|---|---|---|
| 6,269,757 B1 | 8/2001 | Kiest |
| 6,283,049 B1 | 9/2001 | Swanson |
| 6,360,681 B2 | 3/2002 | Swanson |
| 9,043,949 B2 | 6/2015 | Liu et al. |
| 9,232,690 B2 | 1/2016 | Kowalchuk |
| 9,757,744 B2 | 9/2017 | Truan et al. |
| 9,907,224 B2 | 3/2018 | Rosengren et al. |
| 10,028,430 B2 | 7/2018 | Henry et al. |
| 10,271,474 B1 | 4/2019 | Miller et al. |
| 10,377,054 B2 | 8/2019 | Borgmann et al. |
| 10,444,048 B2 | 10/2019 | Humpal et al. |
| 10,576,202 B2 | 3/2020 | Sims et al. |
| 10,577,901 B2 | 3/2020 | Mineo et al. |
| 10,584,828 B2 | 3/2020 | Brooks et al. |
| 10,584,873 B1 | 3/2020 | Bacon |
| 2007/0227418 A1* | 10/2007 | Polfer .................. A01B 39/18 111/127 |
| 2010/0101466 A1 | 4/2010 | Riewerts et al. |
| 2014/0263708 A1 | 9/2014 | Thompson et al. |
| 2014/0277780 A1 | 9/2014 | Jensen et al. |
| 2016/0044862 A1* | 2/2016 | Kocer .................. A01C 23/007 111/118 |
| 2016/0066500 A1 | 3/2016 | Bruns et al. |

FOREIGN PATENT DOCUMENTS

| | | |
|---|---|---|
| KR | 20-0392369 Y1 | 8/2005 |
| KR | 10-0958580 B1 | 5/2010 |
| WO | WO 2015/077452 A1 | 5/2015 |

\* cited by examiner

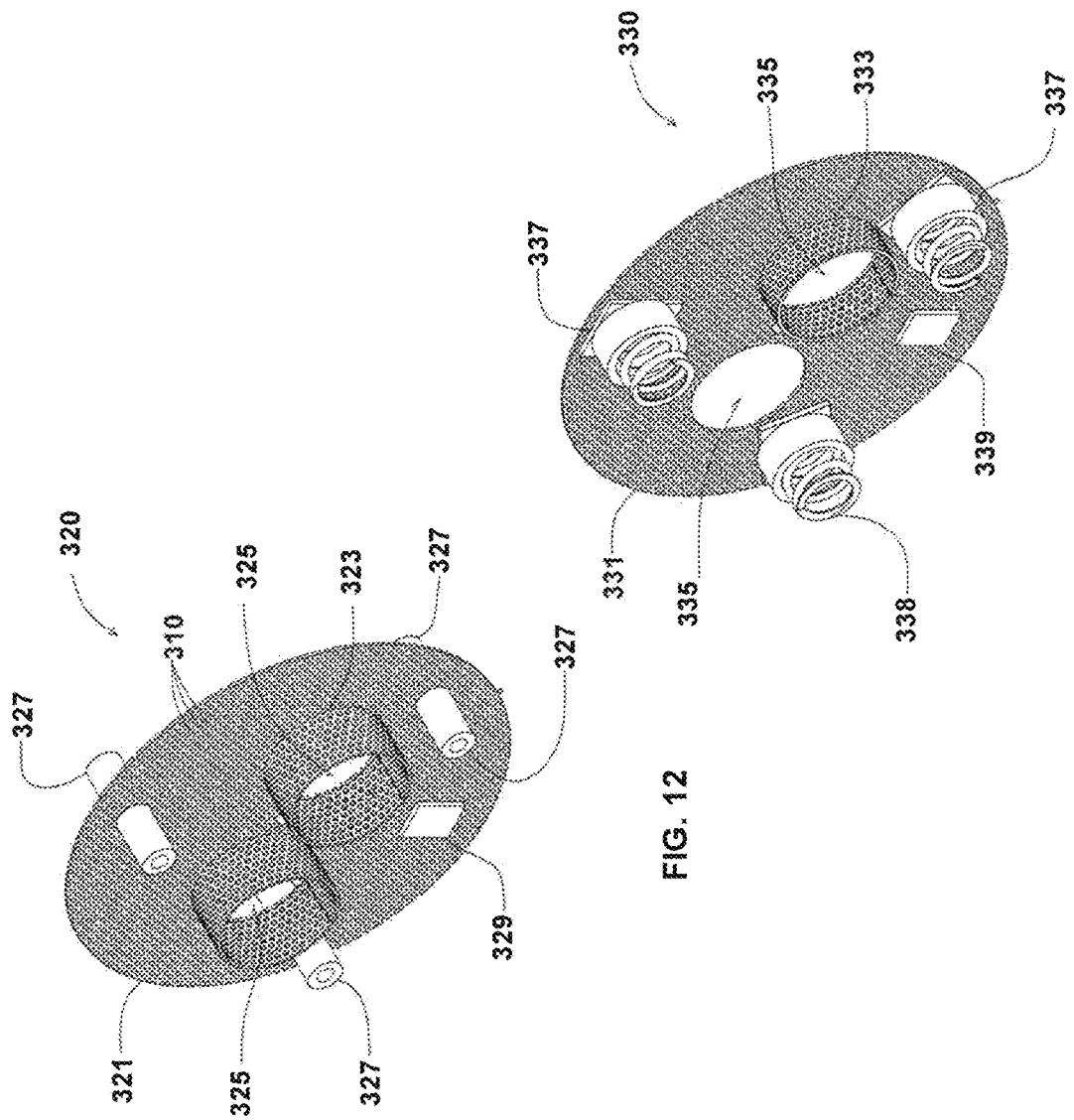

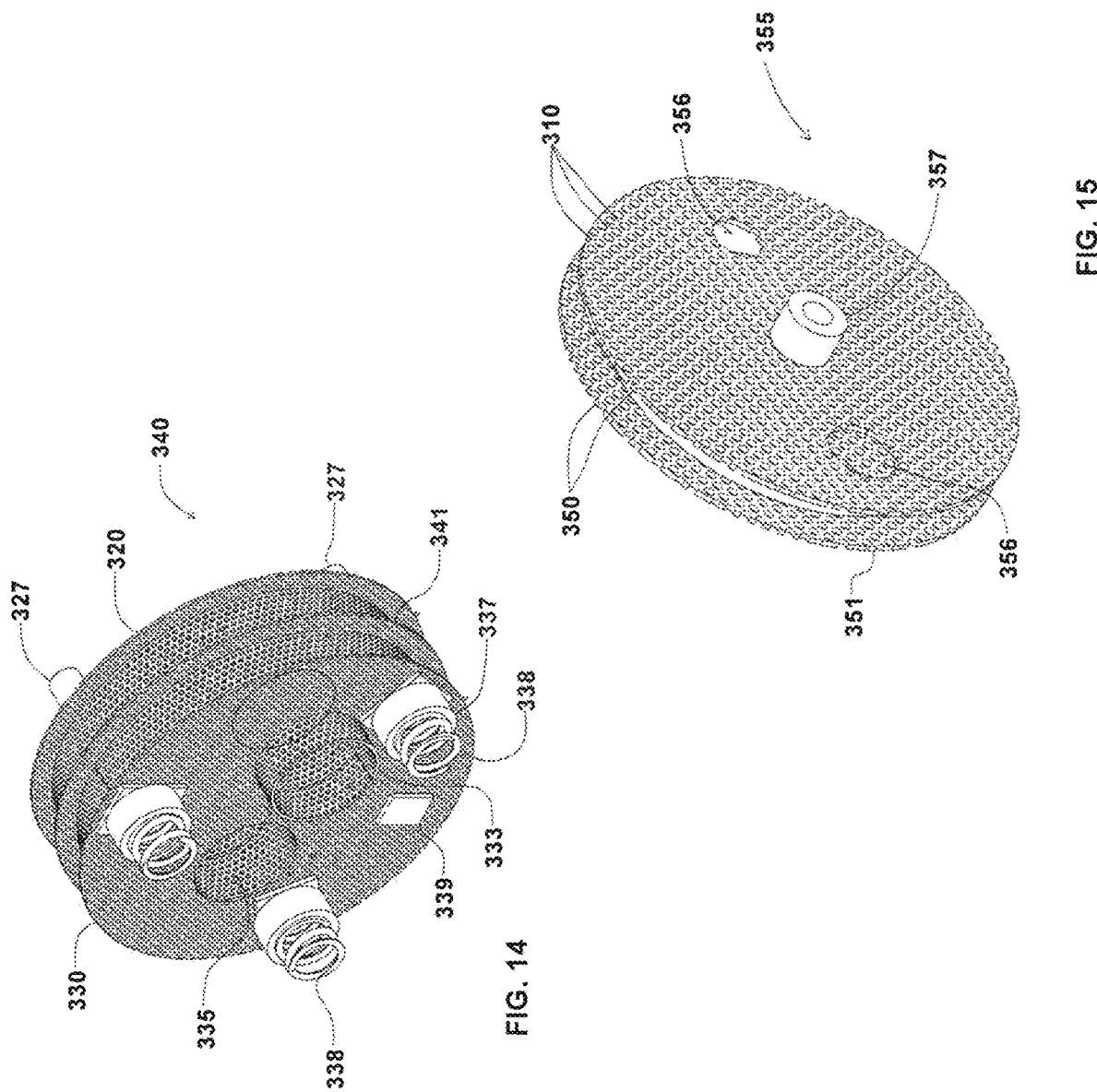

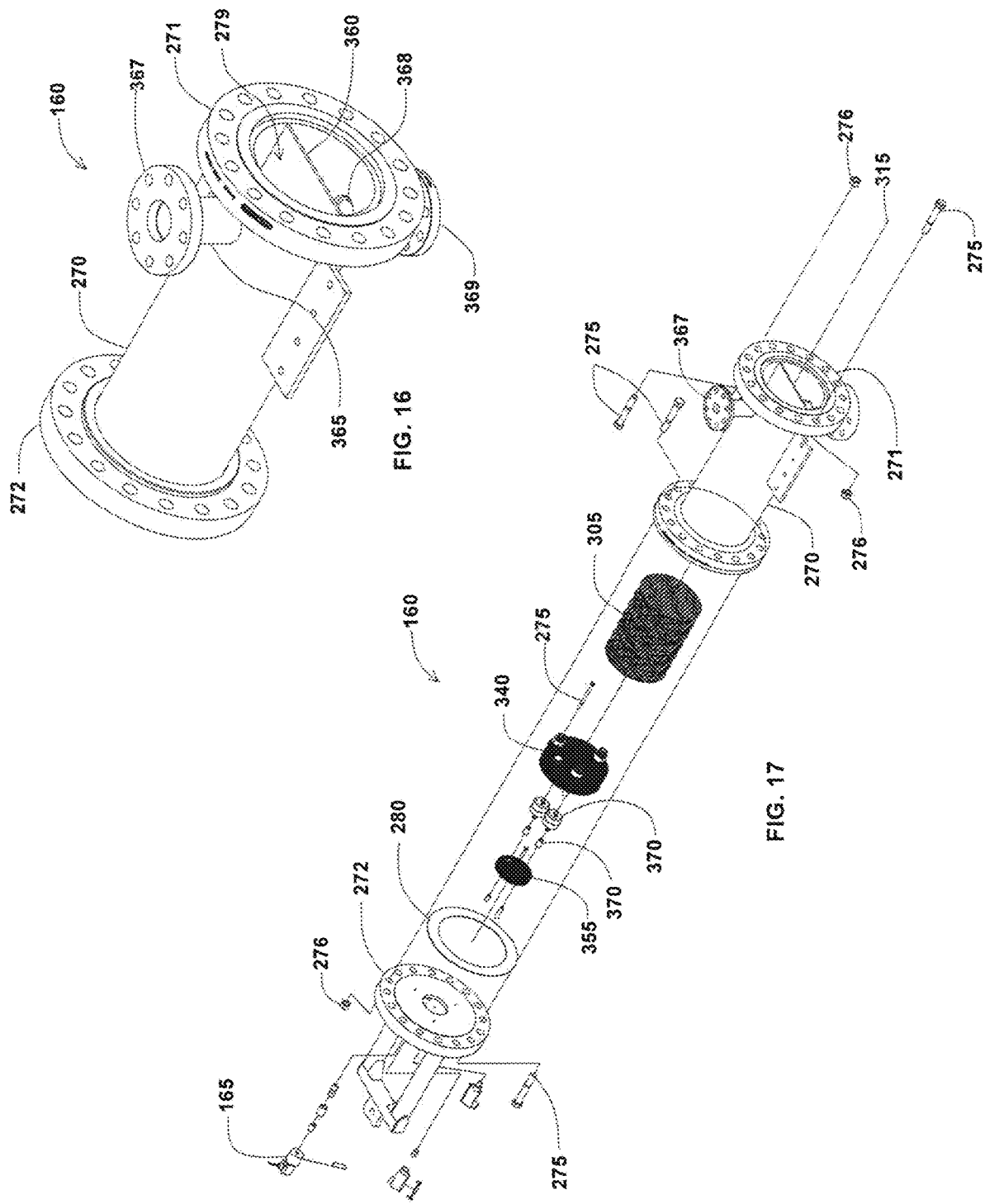

SYSTEM, APPARATUS AND METHOD FOR APPLYING ANHYDROUS AMMONIA (NH3) TO THE SOIL

CROSS-REFERENCE TO RELATED PATENT APPLICATION

This patent application claims the benefit of U.S. Provisional Patent Application No. 62/424,968, filed Nov. 21, 2016, the entire teachings and disclosure of which are incorporated herein by reference thereto.

FIELD OF THE INVENTION

This invention generally relates to the application of Anhydrous Ammonia (Nh3) to the soil. More specifically, the present invention relates to a system, an apparatus and a method for precisely applying Anhydrous Ammonia ($NH_3$) to farmland to increase crop yields.

BACKGROUND OF THE INVENTION

It is generally known to add Anhydrous Ammonia (Nh3) to the soil to increase crop yields. For example, since the 1940's, farmers have used many types of nitrogen to maximize the yield potential of the crops. The injection of Anhydrous Ammonia (Nh3) into the soil is a commonly used method of adding nitrogen to farmland. Typically, Anhydrous Ammonia (Nh3) is 82% nitrogen, by weight. Anhydrous Ammonia ($NH_3$) also referred to frequently in the agricultural/farming community as (Nh3) has the highest concentration of nitrogen of any commercially available agricultural nitrogen fertilizer. For a corn crop to reach a yield goal of 220 bushels per acre, estimates show that the application of approximately 220 pounds per acre of Anhydrous Ammonia (Nh3) is required.

Typically, Anhydrous Ammonia (Nh3) is applied to a field by an Anhydrous Ammonia (Nh3) applicator pulled behind a tractor. The Anhydrous Ammonia (Nh3) applicator pulls an Anhydrous Ammonia (Nh3) nurse tank. Internal vapor pressure inside the Anhydrous Ammonia (Nh3) nurse tank forces the Anhydrous Ammonia (Nh3) from the NH3 nurse tank by natural tank pressure. Both liquid and some vapor move to the Anhydrous Ammonia (Nh3) applicator. Uneven ground creates liquid "sloshing" further increases vapor in an (Nh3) distribution rail of the applicator.

One or two hoses may connect to the liquid draw tube(s) within the Anhydrous Ammonia Nh3 nurse tank to distribution rail system on the Anhydrous Ammonia (Nh3) applicator. The distribution rail system directs the flow of Anhydrous Ammonia (Nh3) into separate but identical lines which feed multiple identical ultra-narrow knives. These ultra-narrow knives are lowered into the soil to a depth of several inches where the Anhydrous Ammonia (Nh3) is uniformly injected directly into the ground at the bottom of each knife. The ultra-narrow knives are pulled through the soil by the tractor at a typical speed of approximately eight miles per hour. Once injected, the Anhydrous Ammonia (Nh3) seeks out and bonds to water molecules in the soil and thereafter becomes available as a crop nutrient NH04.

Although Anhydrous Ammonia (Nh3) is an economical and highly concentrated form of nitrogen due to its unique chemical properties, Anhydrous Ammonia (Nh3) presents the Anhydrous Ammonia (Nh3) applicator with several challenges. The objective of the Anhydrous Ammonia (Nh3) applicator is to apply a predetermined uniform rate of nitrogen in pounds per acre uniformly across the entire field.

In many instances, variable rate (VRT) is used. Variable rate (VRT) is used to save money in areas where not as much nitrogen is needed. In areas where yield history proves high yields exist a higher rate of Nh3 is required. In historically low yielding areas one can save money by using a lower rate of Nh3. In historically high yielding areas one can use a higher rate to help maintain higher yields. If some ultra-narrow knives on the Anhydrous Ammonia (Nh3) applicator receive a disproportionately high flow of Anhydrous Ammonia (Nh3) nitrogen, then other ultra-narrow knives will under apply Anhydrous Ammonia (Nh3) nitrogen. Both under applying and over applying Anhydrous Ammonia (Nh3) adversely impact the prospect of meeting and/or exceeding the yield potential of the crops. Either way it cost the producer money, not to mention the impact on the environment when over applying nitrogen to the water table. It could raise the Nitrate levels of public or private drinking water.

To accurately measure flow and therefore apply the desired rate per acre, a flow measuring device must provide accurate feedback to a rate controller device. There are several suitable turbine style flow meters on the market today, such as, for example, a Raven Precision RFM60S manufactured by Raven Industries, Inc. of Sioux Falls, S. Dak., USA or Sponsler Wafer Series Precision Turbine Flowmeters manufactured by Sponsler of Westminster, S.C. USA. However, this type of flow meter will only give accurate readings when the measured material is in a liquid state and of a uniform velocity across the flow meter diameter. A simultaneous mixture of vapor and liquid will cause turbine style flow meters to report erroneous application rates. As such, by their design capabilities, turbine-style flow meters are sensitive to fluid velocity, but ignore mass density.

Mass flow meters are very accurate at the upper end of typical gallon per minute application rates. However, when the application rate is at a low end of the spectrum, such as, for example, when the operator slows down to turn or navigate around an obstacle, the application rate dips below the operating range of commercially available mass flow meters.

Due to the thermo-chemical properties of Anhydrous Ammonia (Nh3), if delivery in a liquid state is desirable, then two methods of accomplishing this goal may be used. A first method subcools the liquid stream via a heat transfer process while leaving the pressure constant. This is commonly referred to as a "Heat Exchanger." A second method raises the pressure of the liquid stream by using a mechanical or hydraulic driven pump. Both methods arrive at exactly the same state point. Historically, the first method has been the "gold standard" within agriculture.

At 0 lbs. gauge pressure, liquid Anhydrous Ammonia (Nh3) has a boiling point temperature of −28° F. Reaching this temperature utilizing a heat exchanger is impossible due to limitations of the internal surface area; however, temperatures approaching −18° F. are possible, although a temperature of 0° F.-5° F. is more common. In order to reach this liquid temperature, a separate stream of liquid Anhydrous Ammonia (Nh3) from the Anhydrous Ammonia (Nh3) nurse tank must be "sacrificed," thus becoming the heat sink for subcooling the remainder of liquid Anhydrous Ammonia (Nh3) entering the heat transfer process.

The quantity of liquid to be sacrificed becomes a function of its current temperature. For example, assume a tractor speed of eight miles per hour, a 90 foot wide Anhydrous Ammonia (Nh3) applicator and an Anhydrous Ammonia (Nh3) application ratio equal to 300 pounds of 82% Anhydrous Ammonia (Nh3) per acre. Further, assume the current measured temperature is 40° F.; therefore, the absolute pressure is 73.3 PSIA. The liquid sub-cooling heat exchanger has sufficient surface area to cool this liquid stream to 0° F.; therefore, the temperature range on the exchanger high side for this process becomes 40° F. Total heat transferred from the entering liquid stream becomes the product of mass flow (436 pounds/minute) times specific heat (1.08) times temperature range (40° F.) or 18,860 Btu/minute. This heat boils the separated stream of liquid (the heat sink) at a temperature close to −28° F., thus converting this liquid to vapor.

The mass quantity of the liquid stream for this subcooling process may be found by first determining the enthalpies for 40° F. saturated liquid and −28° F. saturated vapor, which are 86.67 Btu/pound and 601.9 Btu/pound, respectively. Since the heat quantity (18,860 Btu/minute) transferred is known, the additional required mass flow of liquid Anhydrous Ammonia (Nh3) for sub-cooling the main liquid stream injected into the field then becomes 36.6 pounds/minute which is determined by dividing heat transferred by the change in enthalpy.

This quantity is then typically split between four points of injection and is in excess of the required 300 pounds/acre already injected into the field. Therefore, instead of moving 300 pounds/acre, it is necessary to transfer the sum of these two liquid streams or 336.6 pounds/minute with 300 pounds/minute going into the field for rebalancing the nitrogen content via fertilization, plus 36.6 pounds/minute additional Anhydrous Ammonia (Nh3). Consequently, this additional Anhydrous Ammonia vapor (Nh3) over applies Nitrogen to those four knives and can be detrimental to crop yield and the environment. This process is known to be very difficult to seal because of frozen tubes.

Prior inventions have successfully achieved liquid stream sub-cooling via an effectively designed heat exchanger apparatus. However, the aforementioned disadvantage of over-application remains a problem. A typical use of a heat exchanger via auto-refrigeration to keep Anhydrous Ammonia (Nh3) in its liquid state is described in U.S. Pat. No. 4,458,609 to Tofte.

The second option for keeping Anhydrous Ammonia (Nh3) in its liquid state is to mechanically pressurize the Anhydrous Ammonia (Nh3). The most common method to apply pressure to a flowing stream of Anhydrous Ammonia (Nh3) uses a hydraulic driven pump. Pressurization of liquid Anhydrous Ammonia (Nh3) for agricultural applications is described in U.S. Pat. No. 5,845,592 to Ridgley and U.S. Pat. No. 6,283,049 to Swanson.

Prior inventions utilizing a pump to maintain pressure in the delivery systems used a design in which liquid Anhydrous Ammonia (Nh3) is pumped into several distribution manifolds, for example, up to three distribution manifolds. Rubber hoses, usually of equal length, are connected to each manifold and terminate at the individual injector ultra-narrow knives for each respective section of the Anhydrous Ammonia (Nh3) applicator. Such a design attempts to achieve uniform application of Anhydrous Ammonia (Nh3) from knife to knife. The distribution manifolds may be pressure actuated which allows the pump to pressurize the distribution rail.

However, when the flow of Anhydrous Ammonia (Nh3) to individual ultra-narrow knives is shut off, for example, as in the case where John Deere Section Control™ (a trademark of Deere & Company of Moline, Ill.) is utilized, then Anhydrous Ammonia (Nh3) remaining in the respective 26 foot long rubber hoses instantly turns to vapor and is released into the atmosphere as the Anhydrous Ammonia (Nh3) applicator is raised out of the ground. The resulting cloud of Anhydrous Ammonia (Nh3) frequently burns the crops in the immediate vicinity. It can pose an inhalation hazard for the operator and people in the immediate area.

A need, therefore, exists for a system, an apparatus and a method for precisely applying Anhydrous Ammonia (Nh3) to farmland for the purpose of increasing crop yields. A need also exists for a system, an apparatus and a method for precisely applying Anhydrous Ammonia (Nh3) to farmland without unwanted excess exposure of Anhydrous Ammonia (Nh3) to the crops and/or the environment.

Embodiments of the invention provide such a system, apparatus, and method. These and other advantages of embodiments of the invention, as well as additional inventive features, will be apparent from the description of the embodiments of the invention provided herein.

BRIEF SUMMARY OF THE INVENTION

Embodiments of the present invention relate to a system, an apparatus and a method for applying liquid Anhydrous Ammonia (Nh3) through an (Nh3) Brechon (Nh3) Distribution Rail to supply an equal amount of Anhydrous Ammonia (Nh3) to each injection location. The use of stainless steel tubing and fittings may allow Anhydrous Ammonia $NH_3$ to be pumped through the (Nh3) Brechon (Nh3) Distribution Rail while experiencing the lowest attainable coefficient of sidewall friction compared to other materials commonly used in this application.

In addition to using superior materials, the use of an (Nh3) Brechon (Nh3) Distribution Rail may dramatically reduce the length of tubing that the Anhydrous Ammonia (Nh3) must pass through prior to being injected into the soil. For example, on a typical fifteen knife Anhydrous Ammonia (Nh3) applicator which uses a distribution manifold method of dividing the flow of Anhydrous Ammonia (Nh3), approximately 425 feet (28 feet per knife) of tubing may be used. A typical fifteen knife Anhydrous Ammonia (Nh3) applicator which may be outfitted with an (Nh3) Brechon (Nh3) Distribution Rail of the present invention requires only 105 feet of tubing for the entire distribution system.

The combination of using stainless steel tubing with a lower coefficient of side wall friction and the shorter distance the Anhydrous Ammonia (Nh3) may travel in the (Nh3) Brechon (Nh3) Distribution Rail may significantly reduce resistance to flow and the overall pressure drop throughout (Nh3) Brechon (Nh3) Distribution Rail. Reduction and/or elimination of pressure drops throughout the (Nh3) Brechon (Nh3) Distribution Rail system are essential to maintain Anhydrous Ammonia (Nh3) in a liquid state. Vapor prevention within the (Nh3) Brechon (Nh3) Distribution Rail assures that each delivery device has the same flowrate.

The delivery devices may be located at the ends of each Anhydrous Ammonia (Nh3) injection point while undergoing identical, individual high pressure drops during normal flow, relative to the total friction loss between the pump outlet and entry to each delivery device.

Prior inventions have used a knife with a carbon steel Brechon-Tube™ that may be approximately 12 inches long with a ⅜ inch inside diameter. Embodiments of the present invention may use a stainless steel Brechon-Tube™ which may be 12 inches long and may have an inside diameter of 0.120 inch with a Cv equal to 0.28. For example, the delivery tube may be a Brechon-Tube™ manufactured by Agri-Inject, Inc., Yuma, Colo. USA. The 68% smaller inside diameter of the Brechon-Tube™ may enable the pump to build and maintain pressure throughout the entire (Nh3) Brechon (Nh3) Distribution Rail delivery system without an engineered orifice.

Prior inventions have used engineered orifices to maintain sufficient pressure throughout the delivery system. However, such an approach may require the operator to manually change the orifice each time there may be a change in the desired application rate. Embodiments of the present invention may not require manual adjustment to change the desired application rate. Instead, the system may remain pressured by virtue of the Brechon-Tube™, and the operator may be able to change the desired application rate using a John Deere GS3 display in conjunction with a John Deere Rate Controller or a Raven Viper Pro display in conjunction with a Raven Rate controller.

The pump may be volume sensitive and may supply the exact quantity of Anhydrous Ammonia (Nh3) required relative to both speed and application ratio. A pressure sensitive liquid return valve may maintain delivery pressure by continuously returning a preset quantity of liquid Anhydrous Ammonia (Nh3) to the overpressure bypass inlet of a vapor eliminator which may be mounted above the pump suction.

It is, therefore, an advantage of embodiments of the present invention is to provide a system, an apparatus and a method for applying Anhydrous Ammonia (Nh3) to the soil.

Another advantage of embodiments of the present invention to provide a system, an apparatus and a method for precisely applying Anhydrous Ammonia (Nh3) to the soil on farmland to increase crop yields.

Moreover, an advantage of embodiments of the present invention is to provide a system, an apparatus and a method for applying Anhydrous Ammonia (Nh3) to the soil which may reduce the amount of excess Anhydrous Ammonia (Nh3) that may be released onto crops during operation.

A further advantage of embodiments of the present invention is to provide a system, an apparatus and a method for applying Anhydrous Ammonia (Nh3) to the soil which may reduce the amount of excess Anhydrous Ammonia (Nh3) that may be released as an inhalation hazard for the operator during operation.

Further, an advantage of embodiments of the present invention is to provide a system, an apparatus and a method for applying Anhydrous Ammonia (Nh3) to the soil which may have a vapor eliminator with both vertical and horizontal perforated baffling to reduce excessive vapor which may waste Anhydrous Ammonia (Nh3).

Moreover, an advantage of embodiments of the present invention is to provide a system, an apparatus and a method for applying Anhydrous Ammonia (Nh3) to the soil which may enable a pump to increase, lower or maintain pressure throughout an entire (Nh3) Brechon (Nh3) Distribution Rail delivery system without a need for an engineered orifice.

Another advantage of embodiments of the present invention is to provide a system, an apparatus and a method for applying Anhydrous Ammonia (Nh3) to the soil without manually changing the orifice each time there may be a change in the desired application rate.

Still further, an advantage of embodiments of the present invention is to provide a system, an apparatus and a method for applying Anhydrous Ammonia (Nh3) to the soil without manual adjustment to change the desired application rate.

Another advantage of embodiments of the present invention is to provide a system, an apparatus and a method for applying Anhydrous Ammonia (Nh3) to the soil which may protect open ends of delivery tubes from plugging if the operator were to accidentally drop the ultra-narrow knives into the soil before moving the tractor. A result of this plugging is no or little nitrogen is applied to some areas of the field while other areas have over application.

Also, an advantage of embodiments of the present invention is to provide a system, an apparatus and a method for applying Anhydrous Ammonia (Nh3) to the soil which may have identical throttling means at each point of delivery of the Anhydrous Ammonia (Nh3).

A further advantage of embodiments of the present invention is to provide a system, an apparatus and a method for applying Anhydrous Ammonia (Nh3) to the soil which may maintain liquid pressure by using a liquid return valve controlled from differential pressure continuously reset from a programmable logic controller ("PLC").

Still another advantage of embodiments of the present invention is to provide a system, an apparatus and a method for applying Anhydrous Ammonia (Nh3) to the soil which may redirect liquid and vapor under the knife at 90 degrees to the soil through large openings on each side of injector knife.

Also, an advantage of embodiments of the present invention is to provide a system, an apparatus and a method for applying Anhydrous Ammonia (Nh3) to the soil which may have a vapor eliminator constructed, e.g., from 300 pound steel pipes and/or flanges for safety.

In one aspect, an embodiment of the invention provides, an applicator for applying NH3 to an agricultural field. The applicator includes a distribution rail for receiving and out letting a flow of the NH3. The distribution rail has a decreasing inner diameter from an inlet of the distribution rail to distal ends of the distribution rail.

In an embodiment, the decreasing inner diameter is a stepped decrease.

In an embodiment, the applicator includes a first flow meter upstream of the distribution rail for measuring an actual flow rate of a flow of the NH3. The applicator also includes a plurality of valves downstream of the distribution rail. The applicator includes a plurality of delivery tubes. Each respective one of the plurality of delivery tubes is in series with and downstream of a respective one of each of the plurality of valves. The plurality of valves are configured to be controlled to provide a desired flow rate of the flow through the delivery tubes.

In an embodiment, the plurality of valves are ball valves.

In an embodiment, the ball valves are configured to be controlled automatically to an open state and a closed state.

In an embodiment, the applicator includes a coulter, knife and closing disc for each one of the plurality of delivery tubes. The coulter is configured to cut a groove in the agricultural field as the applicator is pulled over the agricultural field. Each one of the delivery tubes is configured to deliver the flow into the groove. The knife is configured to cut the flow of $NH_3$ into the soil.

In an embodiment, each one of the delivery tubes is located between a scraper bracket and the coulter.

In an embodiment, each one of the delivery tubes and the distribution rail are entirely stainless steel.

In an embodiment, the applicator includes upstream of the distribution rail a vapor eliminator and a liquid return valve. The liquid return valve is configured to return a portion of the flow from the vapor eliminator to an inlet of the vapor eliminator.

In an embodiment, the applicator includes a positive displacement pump located between the vapor eliminator and the distribution rail.

In an embodiment, the applicator includes a plurality of valves downstream of the distribution rail and a plurality of delivery tubes. Each respective one of the plurality of delivery tubes is in series with and downstream of a respective one of each of the plurality of valves.

In an embodiment, the plurality of valves are configured to be controlled to provide a desired flow rate unique to each one of plurality of valves.

In an embodiment, each one of the plurality of valves are located respectively between a one of a plurality of delivery flow meters downstream of the distribution rail and a one of a plurality of delivery tubes downstream of the distribution rail.

In an embodiment, each one of the plurality of valves is a pulse width modulation valve, each one of the pulse width modulation valves configured to be automatically adjusted with a controller to provide an actual flow rate unique to each one of the plurality of valves.

In an embodiment, each one of the plurality of valves, the pump, and a differential set point of the liquid relief valve are configured to be automatically adjusted with a controller to provide an actual flow rate unique to each one of the plurality of valves.

In an embodiment, the applicator includes a coulter, a knife and a closing disc for each one of the plurality of delivery tubes. The coulter is configured to cut a groove in the agricultural field as the applicator is pulled over the agricultural field. Each one of the delivery tubes is configured to deliver the flow of $NH_3$ into the groove. The knife is configured to cut the flow of NH3 into the soil.

In an embodiment, each one of the delivery tubes terminates under a heel of the knife. The heel is configured to divide the flow in half and apply each half of the flow at approximately 90 degrees to sides of the groove.

In an embodiment, the vapor eliminator includes a housing defining a central cavity, an inlet and an outlet for the flow. The vapor eliminator also includes a plurality of horizontal and vertical baffles arranged in the central cavity to separate vapor from liquid in the flow. The vapor eliminator includes a gas vent for out letting the vapor; and an overpressure bypass inlet fluidly connected to an outlet of the liquid relief valve.

In an embodiment, the plurality of horizontal and vertical baffles includes at least one non perforated baffle and a plurality of perforated baffles.

In yet another aspect, an embodiment of the invention provides a system for applying $NH_3$ to an agricultural field. The system includes an applicator for applying NH3 to an agricultural field. The applicator includes a distribution rail for receiving and out letting a flow of the $NH_3$ The distribution rail has a decreasing inner diameter from an inlet of the distribution rail to distal ends of the distribution rail. The system also includes a vehicle for pulling the applicator over the agricultural field and a nurse tank of $NH_3$ in fluid connection with the applicator. The system includes a pump and hydraulic motor fluidly connected between the nurse tank and the applicator and a controller for controlling the plurality of valves, the positive displacement pump, and the hydraulic motor.

In an embodiment, the controller is configured to open the plurality of valves and set a speed of the pump to provide an identical desired flow rate through each one of the plurality of delivery tubes.

In an embodiment, the controller is configured to receive an actual flow rate from the first flow meter, the speed of the pump and adjust the speed of the positive displacement pump to adjust the actual flow rate when the actual flow rate falls outside the desired flow rate.

In and embodiment, the applicator includes upstream of the distribution rail a vapor eliminator and a liquid return valve. The liquid return valve configured to return a portion of the flow from the vapor eliminator to an inlet of the vapor eliminator.

In an embodiment, the system includes a plurality of valves downstream of the distribution rail and a plurality of delivery tubes in series with and downstream of a respective one of each of the plurality of valves.

In an embodiment, the plurality of valves are configured to be controlled to provide a desired flow rate unique to each one of plurality of valves.

In an embodiment, the controller is configured to set the state of the plurality of valves, set a speed of the positive displacement pump, and set a differential set point of the liquid relief valve to provide the desired flow rate.

In an embodiment, the controller is configured to receive an actual flow rate from the first flow meter, the speed of the pump, the actual flow rate through each one of the plurality of valves and adjust, the speed of the pump, the differential set point, and the state of each one of the plurality of valves to adjust the actual flow rate though each one of the plurality of valves when the actual flow rate falls outside the desired flow rate.

In an embodiment, the applicator includes a temperature sensor at the inlet of the vapor eliminator and a pressure transducer downstream of the pump. The adjusted flow rate set by the controller is further based on receipt of a sensed measurement from the temperature sensor and the sensed pressure received from pressure transducer.

In yet another aspect, the invention provides for a method for applying anhydrous ammonia, $NH_3$, to a plurality of crop rows in a field, the method includes the steps of determining a desired uniform rate of $NH_3$ to apply to the plurality of crops with an $NH_3$ applicator. The Applicator includes a flow meter upstream of a distribution rail and a plurality of valves, each respective one of the plurality of valves in series with a respective one of a plurality of delivery tubes downstream of the distribution rail. The distribution rail has a decreasing diameter from an inlet to distal ends of the distribution rail. The method further includes the steps of calculating a desired flow rate of $NH_3$ through the plurality of delivery tubes. The method includes the step of setting a speed of a pump fluidly connected to the applicator to apply the desired flow rate and applying the NH3 with the applicator. The method includes the step of sensing an actual application rate at the flow meter and comparing the desired application rate with the actual application rate. The method includes adjusting at least the speed of the pump to adjust the actual application rate when the actual application rate falls outside the desired application rate.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of embodiments of the present invention and, together with the description, serve to explain the principles of the invention. In the drawings:

FIG. 12 illustrates an isometric view of a baffle component for use in a vapor eliminator in an embodiment of the present invention;

FIG. 13 illustrates an isometric view of another baffle component for use in a vapor eliminator in an embodiment of the present invention;

FIG. 14 illustrates an isometric view of a plurality of perforated baffles for use in a vapor eliminator in an embodiment of the present invention;

FIG. 15 illustrates an isometric view of a plurality of perforated baffles for use in a vapor eliminator in an embodiment of the present invention;

FIG. 16 illustrates an isometric view of a vapor eliminator in an embodiment of the present invention;

FIG. 17 illustrates an exploded isometric view of a vapor eliminator in an embodiment of the present invention;

While the embodiments of the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
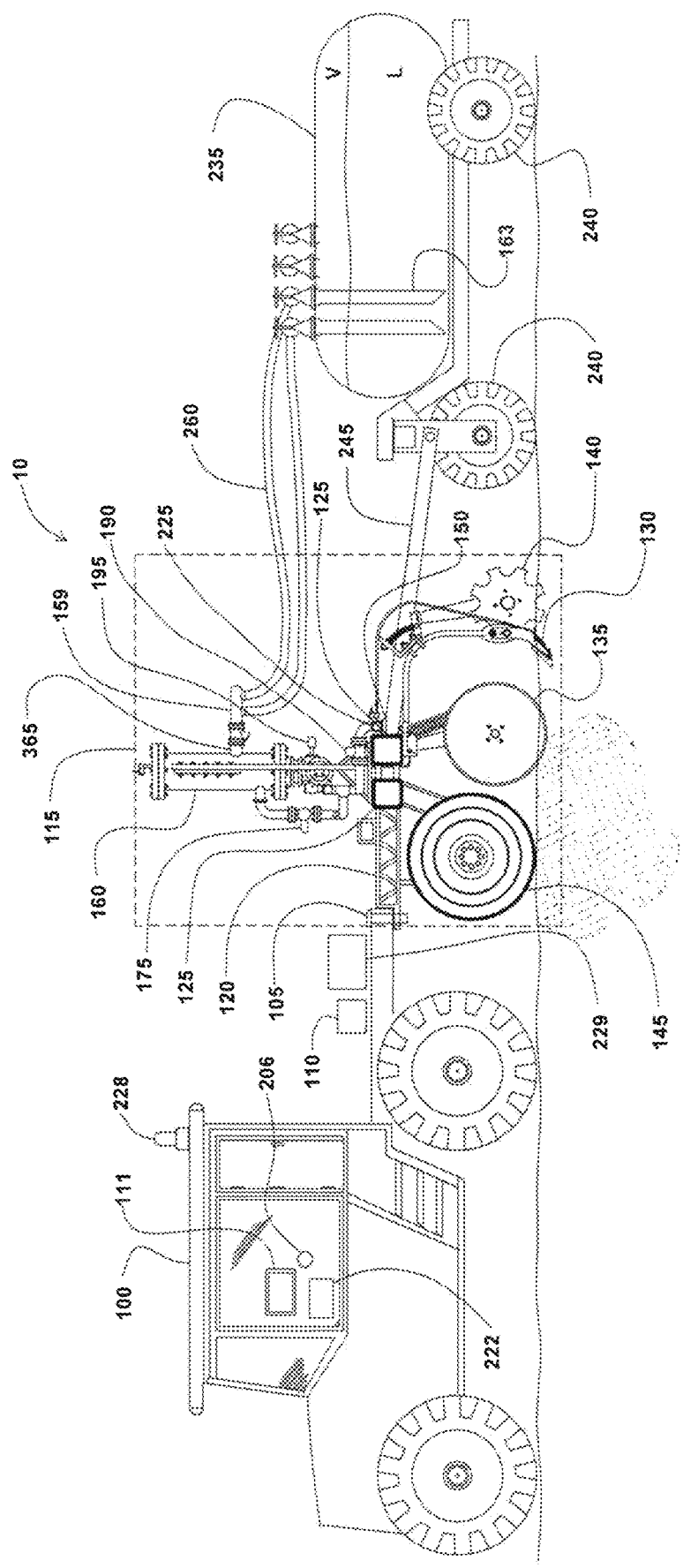
FIG. 1 illustrates an embodiment of the present invention having an Anhydrous Ammonia (Nh3) applicator pulled behind a tractor, the Anhydrous Ammonia (Nh3) applicator pulls an Anhydrous Ammonia (Nh3) nurse tank.

Referring to the drawings wherein like numerals represent like parts, FIG. 1 illustrates a system 10 in an embodiment of the present invention. The system 10 may be pulled behind a tractor 100, a truck and/or the like. In an embodiment, the system 10 may have an Anhydrous Ammonia (Nh3) applicator 115 with an Anhydrous Ammonia (Nh3) applicator John Deere DB90 Bar 125 which may support a plurality of ultra-narrow injector knives 130, coulters 135, closing disks 140, an (Nh3) Brechon (Nh3) Distribution Rail 225 and a vapor eliminator 160. The Anhydrous Ammonia (Nh3) applicator 115 may be supported by a plurality of Tire and Rim 145 and may have a tongue 120 that may be pivotally connected to a tractor hitch 105 on the tractor 100.

A Nh3 nurse tank 235 may have a tongue 245 that may be pivotally connected to an applicator hitch 150 on the rear of the Anhydrous Ammonia (Nh3) applicator 115. The Nh3 nurse tank 235 may be a commercially available pressurized tank, which when filled to capacity, may hold a predetermined quantity of Anhydrous Ammonia (Nh3). The Nh3 nurse tank 235 may contain the Anhydrous Ammonia (Nh3) as a liquid as indicated by reference letter L and/or as a vapor as indicated by reference letter V in FIG. 1. The Nh3 nurse tank 235 may be supported by a plurality of Tire and Rim 240.

Figure 2:
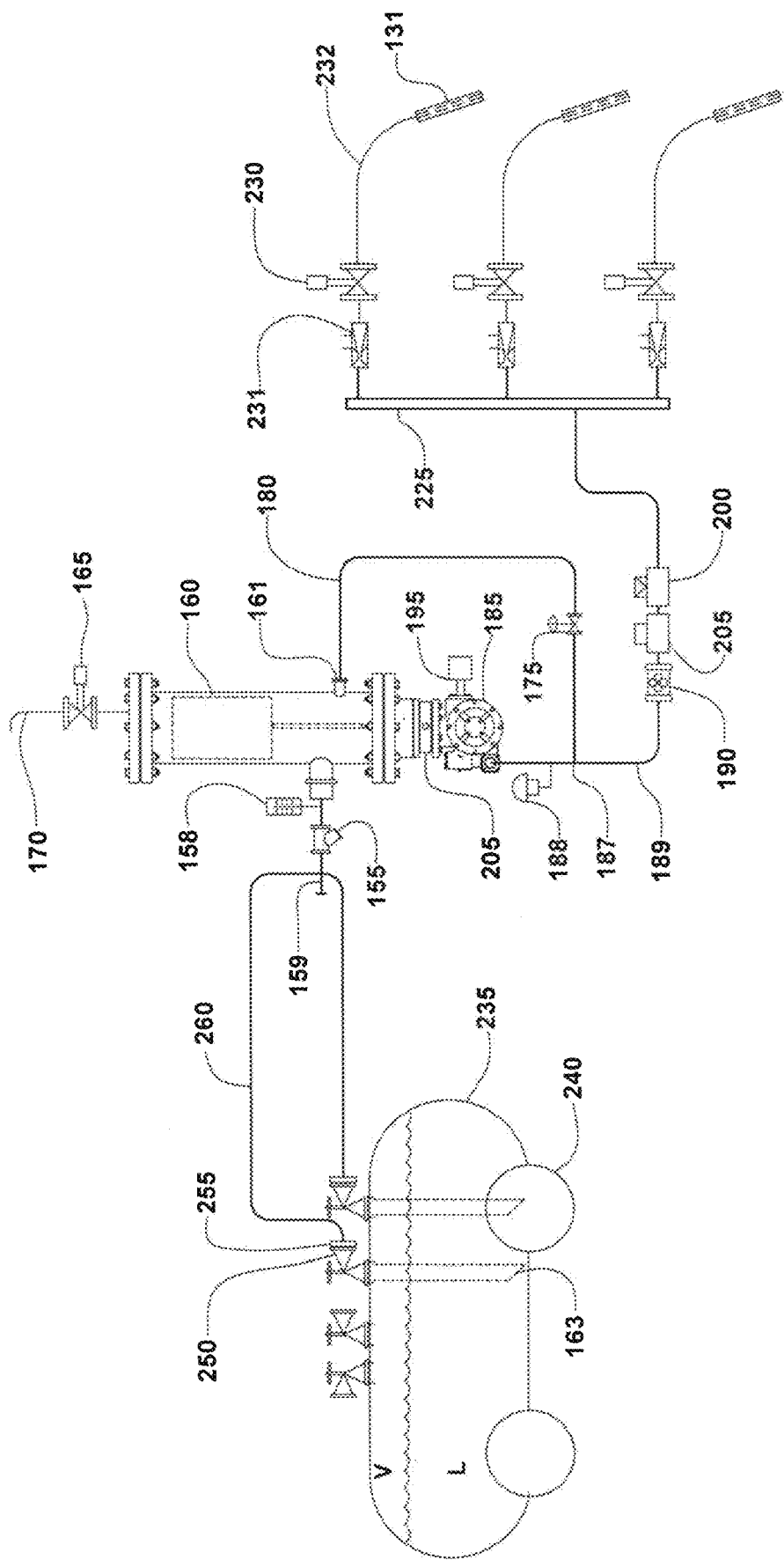
FIG. 2 illustrates a schematic diagram of an embodiment of the present invention having piping and instrumentation for the Anhydrous Ammonia (Nh3) applicator apparatus.

Referring to FIG. 2, dual delivery hoses 260 may deliver liquid Anhydrous Ammonia (Nh3) from the Nh3 nurse tank 235 to the vapor eliminator 160. The dual delivery hoses 260 may be for example, 1.5 inch I.D. reinforced, neoprene-lined hose. Draw tubes 163 may be located within the Nh3 nurse tank 235 to provide flow of the liquid Anhydrous Ammonia (Nh3) from the Nh3 nurse tank 235 to the dual delivery hoses 260. The dual delivery hoses 260 may also connect to a horizontal pipe 159 that may be approximately four inches in diameter. The horizontal pipe 159 may connect to the vapor eliminator 160.

As shown in FIG. 2, the liquid Anhydrous Ammonia (Nh3) may pass from the Nh3 nurse tank 235 through a manual shut off 250, a breakaway coupler 255, the dual delivery hoses 260, a strainer 155 and the horizontal pipe 159. A temperature transmitter 158 may be installed on the horizontal pipe 159 and may sense the temperature of the inbound liquid. Using an algorithm, the temperature transmitter 158 may convert this temperature to units of absolute pressure. The signal may also be used for the temperature of liquid on the discharge side of a positive displacement pump 185, also hereinafter referred to as vane pump 185, within the Anhydrous Ammonia (NH3)(Nh3) distribution rail Brechon (Nh3) Distribution Rail 225 because no temperature change occurs when pumping a solid column of liquid.

Flash vapor may occur inside piping in certain situations, such as, for example, at saturation, due to side wall friction and/or internal fluid friction and/or due to a decrease in liquid static elevation head. At a maximum flow of 80 GPM and a six foot elevation rise from the freeboard elevation inside the Anhydrous Ammonia (Nh3) nurse tank 235 to the inlet to the vapor eliminator 160, approximately ⅕th of one percent by mass flashes to vapor, assuming a liquid temperature of 50° F. The remaining 99.8% liquid may enter the Vane Pump 185 which may raise the liquid pressure to a sufficient point to prevent vapor formation and/or flashing within the (Nh3) Brechon (Nh3) Distribution Rail 225.

The ⅕th of one percent flash vapor may take the following path: vapor bubbles may first begin to form inside the draw tubes 163 in the Nh3 nurse tank 235 when internal liquid passes above the elevation of external liquid outside the draw tubes 163. As the flash vapor continues to rise up the dip tube 163, additional vapor bubbles may occur from friction within the dip tube 163, elevation change and from the manual shutoff valves 250 Liquid may enter each dual delivery hose 260 and may undergo additional vapor formation. Upon entering the vapor eliminator 160, the velocity of the liquid may have slowed sufficiently to permit the lighter vapor to rapidly rise and separate from the heavier liquid before entering the vapor eliminator 160. A level control internal to the vapor eliminator 160 may open a gas vent valve 165 which may release the ⅕th of one percent vapor to the atmosphere after passing through a one-quarter inch diameter plastic gas vent hose 170.

As shown in FIG. 2, the now higher pressure liquid may exit the Vane Pump 185 and may enter a main liquid supply pipe 189. A pressure transducer 188 may sense the absolute pressure of liquid within the main liquid supply pipe 189 and may send the information to a programmable logic controller 229 on the tractor 100 as shown in FIG. 1. From here, liquid Anhydrous Ammonia (Nh3) may enter into a tee 187. A first end of a liquid return pipe 180 may connect to the bull of the tee 187, and a second end of the liquid return pipe 180 may connect to the inlet side of a pressure-sensitive liquid return valve 175. An outlet of the liquid return valve 175 may connect to a overpressure bypass inlet 161 of the vapor eliminator 160.

FIG. 2 illustrates that the liquid Anhydrous Ammonia (Nh3) may flow in succession through the run of the tee 187 to a turbine-style flow meter 190, a hydraulic motor 195, an electronic shut off valve 200 and a back up hydraulic shut off valve 205. The turbine-style flow meter 190 may sense the Anhydrous Ammonia (Nh3) flow and may electronically signal a rate controller 110 and the programmable logic controller 229 as shown in FIG. 1. In an embodiment, the rate controller module 110 may be a John Deere Rate Controller (manufactured by Deere & Company of Moline, Ill.) or a Raven Rate controller (manufactured by Raven Industries, Inc. of Sioux Falls, S. Dak.). The backup hydraulic shutoff valve 205 acts as a failsafe control in the event of an accidental release of anhydrous liquid to the atmosphere.

An in-cab rate controller interface 111 and rate controller module 110 mounted upon John Deere DB90 Bar shown in FIG. 1 may receive information and may display information concerning the rate of application of the Anhydrous Ammonia (Nh3). A second display 222 may show the present flow rate sensed by the turbine-style flow meter 190 so that the operator of the tractor 100 may monitor and may compare the two values and modify the Anhydrous Ammonia (Nh3) application prescription using the in-cab rate controller interface 111. The electronic shut off valve 200 shown in FIG. 2 may respectively open and close when the Anhydrous Ammonia (Nh3) applicator 115 may be lowered into and may be raised out of the soil by the in-cab rate controller interface 111. In an embodiment, the in-cab rate controller interface 111 may be a John Deere GS3 2630 (manufactured by Deere & Company of Moline, Ill.) or a Raven Viper Pro (manufactured by Raven Industries, Inc. of Sioux Falls, S. Dak.).

The backup hydraulic shut off valve 205 which may operate independent of the in-cab rate controller interface 111 may allow the operator in the tractor 100 to shut off the flow of Anhydrous Ammonia (Nh3) to the Anhydrous Ammonia (Nh3) applicator 115 in the event of a malfunction with the in-cab rate controller interface 111 and/or with an E Stop 206 shown in FIG. 1. When both the electronic shut off valve 200 and the backup hydraulic shut off valve 205 may be open, the flow of Anhydrous Ammonia (Nh3) may become divided into equal halves by an (Nh3) Brechon (Nh3) Distribution Rail 225. FIG. 2 illustrates that the Anhydrous Ammonia (Nh3) may flow respectively through a plurality of venturi style flow meters 231, identical proportional electronic PWM Valves 230, a flexible braided hose 232 and into a Brechon-Tube™ 131. The Brechon-Tube™ 131 may be a Brechon-Tube™ manufactured by Agri-Inject, Inc., Yuma, Colo. USA.

Figure 4:
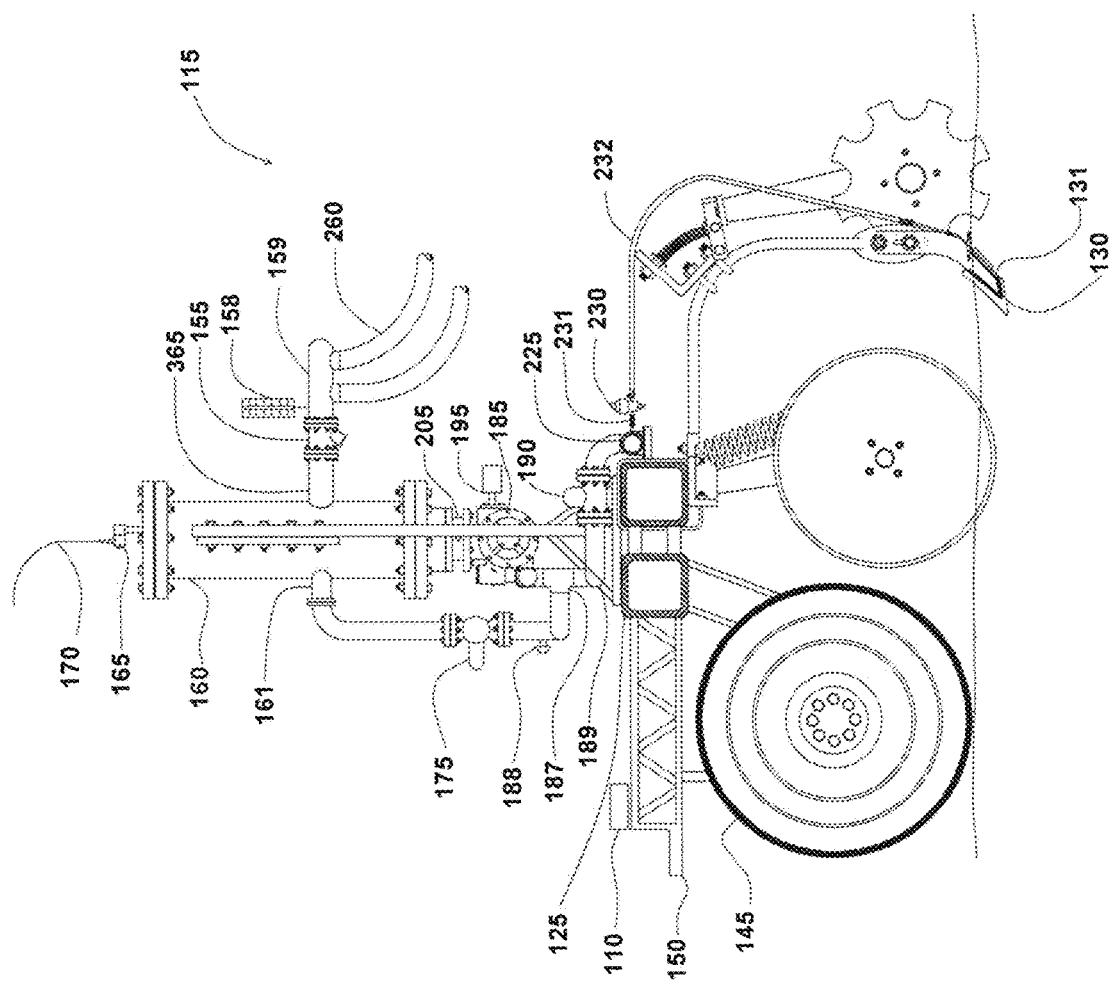
FIG. 4 illustrates an elevation view of the Anhydrous Ammonia (Nh3) applicator in an embodiment of the present invention.
Figure 7:
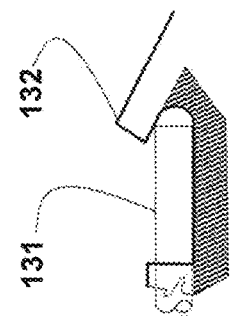
FIG. 7 illustrates a detail view of the Brechon-Tube™ termination under a heel of the injector knife in an embodiment of the present invention.
Figure 6:
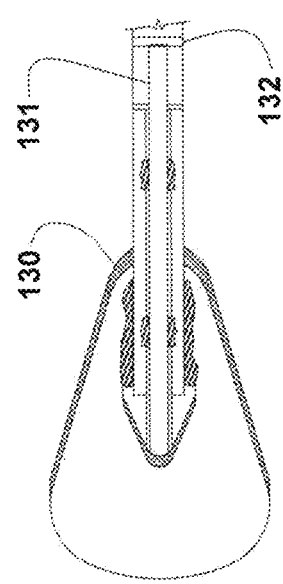
FIG. 6 illustrates a bottom view of the injector knife showing entrance and termination of the Brechon-Tube™ in an embodiment of the present invention.
Figure 5:
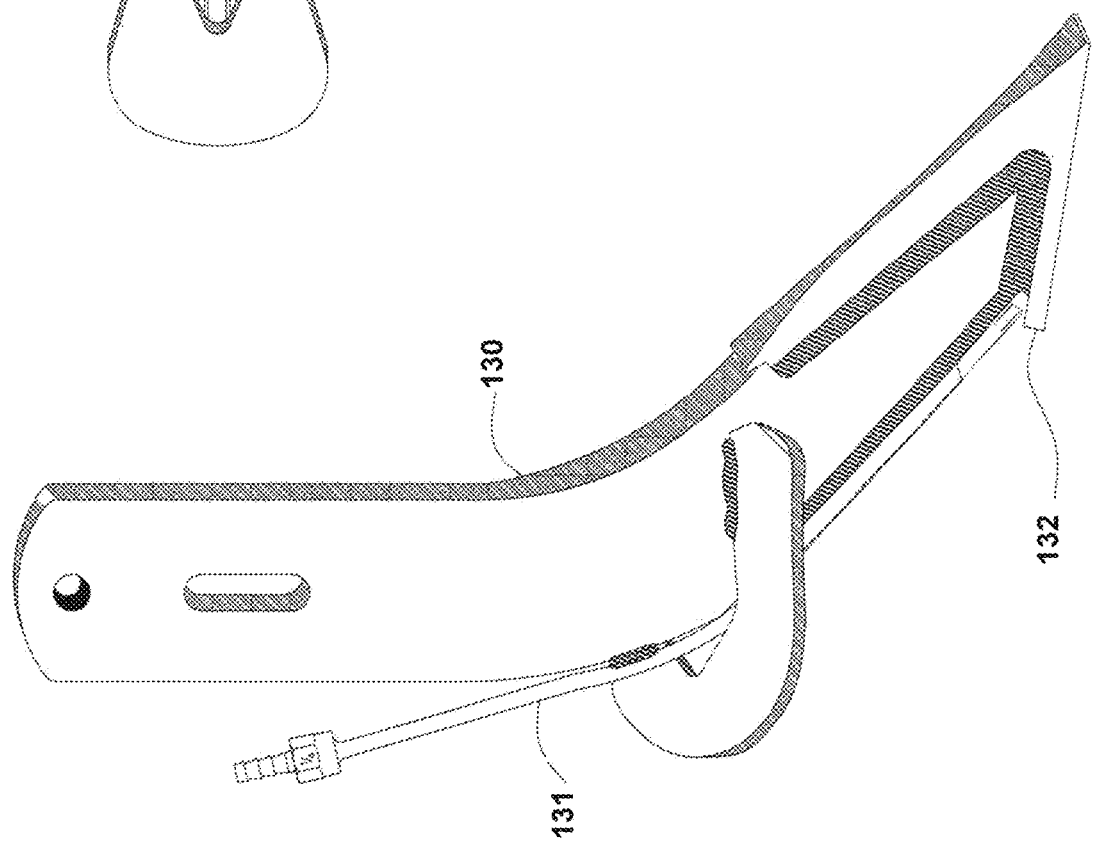
FIG. 5 illustrates an elevation view of an injector knife and a Brechon-Tube™ in an embodiment of the present invention.

Jumping ahead for a moment to FIGS. 5-7, each Brechon-Tube™ 131 may be secured to the underside of each ultra-narrow injector knife 130. Each Brechon-Tube™ 131 may terminate directly under a heel 132 of each ultra-narrow injector knife 130. In this position, two advantages may be achieved. The first advantage may be that the open ends of Brechon-Tube™ 131 may be protected from plugging if the operator were to accidentally drop the ultra-narrow knives 130 into the soil before moving the tractor 100 shown in FIG. 1. The second advantage achieved relates to the direction of flow of liquid and vapor upon exiting the Brechon-Tube™ 131. The flow may be divided into halves under the heel 132 and may be further directed into the soil at 90 degree angles to sides of the soil cut by the coulter 135 (as shown in FIGS. 1 and 4). FIGS. 5-7 show the larger open area formed on either side of the ultra-narrow injector knife 130 for the exiting Anhydrous Ammonia (Nh3).

Figure 21:
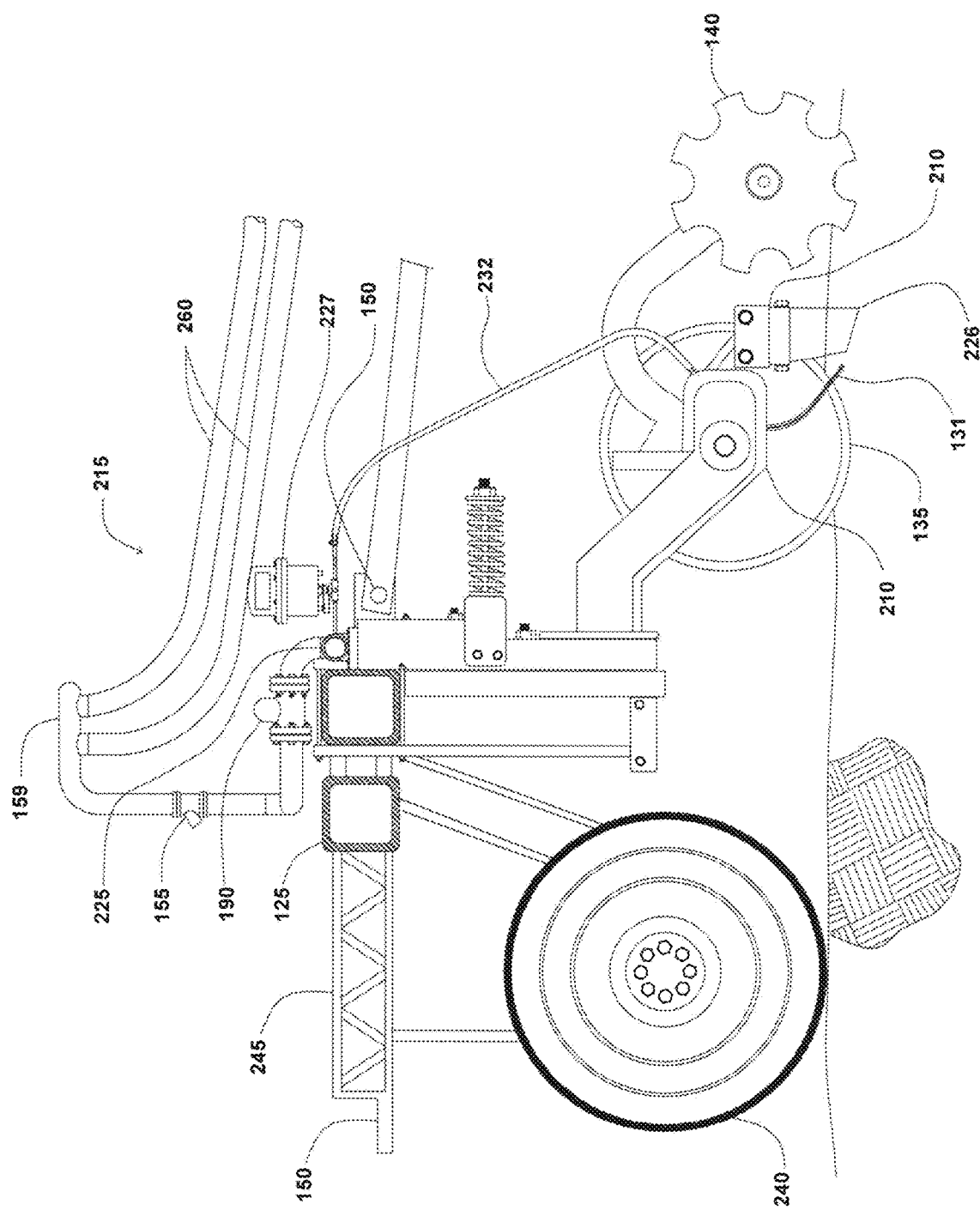
FIG. 21 illustrates an alternate embodiment utilizing the Brechon-Tubes™ in conjunction with the coulters to inject the NH3 into the field.

In an alternate embodiment illustrated in FIG. 21, the injector knives 130 have been replaced with knives 226. The injection of NH3 is accomplished by positioning the Brechon-Tubes™ 131 in proximity to the coulter 135 such that the injection orifice is in the slit in the soil made by the coulter 135. Such a configuration minimizes the amount of debris that may be caught by the knives 226 that could increase the drag during applications. Preferably, the depth of the slit allows application of the NH3 at about 4 inches depth.

With respect to FIG. 1, optimum Anhydrous Ammonia (Nh3) flow to each crop row through the Brechon-Tube™ 131 may be predicted by first finding the speed of the tractor 100 from a GPS receiver 228 and then checking the Anhydrous Ammonia (Nh3) application ratio, for example, 300 pounds per acre. Using an algorithm within the PLC 229, an instantaneous rate of Anhydrous Ammonia (Nh3) flow may be calculated. This figure may be divided by the number of rows to be fed, for example, 36 rows on a 90 foot bar, to arrive at the instantaneous feed rate to an individual row. Accordingly, the system utilizing PLC 229, takes into account the geographic location of the field and the historical data of that fields soil in addition to the number of rows to which the NH3 is to be applied and the speed of which the tractor 100 will apply the NH3 to derive a desired flow rate through each Brechon-Tube™ of NH3 to be applied to the field. Once the desired flow rate is calculated with the PLC 229, then the PLC 229 controls the speed of vane pump 185 with hydraulic motor 195, differential set point of liquid return valve 175, and each one of the PWM valves 230 to set a desired flow rate that is unique to each one of the Brechon-Tubes™ 131.

Once flow occurs of the NH3 in the system 10, PLC 229 may verify the present rate of Anhydrous Ammonia (Nh3) flow detected by the venturi-style flow meter 231 shown in FIG. 2. Also, the PLC 229 may readjust the flow to agree with the row value required for the running speed by repositioning each proportional electronic PWM Valve 230. Adjustment may be achieved either by modulating the port plug position with a servo-motor or by Anhydrous Ammonia (Nh3) pulse-width modulation (PWM Valve) in response to software within the PLC 229 whenever the flow rate may fall below 50%. Anhydrous Ammonia (Nh3) flow through the proportional electronic PWM Valve 230 may be preferred when coupled to a venturi-style flow meter 231 because the signal controlling each proportional electronic PWM Valve 230 may originate from the PLC 229 which received a signal from an adjacent venturi-style flow meter 231. Further, the fluid may be held in a liquid state by the differential set-point of the liquid return valve 175.

Thus, during actual application of the NH3 using system 10, PLC 229 is already programmed with the number of rows its associated applicator 115 will inject NH3 as well as soil history for a geographic location, and then receives input from temperature sensor 158, vane pump 185 speed, pressure sensor 185, liquid relief valve 175, turbine style flow meter 190, each venturi-style flow meters 231, and GPS receiver 228 for geographic location and thus tractor 100 speed. From these inputs, PLC 229 is able to automatically, that is without an operator input, adjust the desired flow rate through each venturi style flow meter 230 to a unique adjusted flow rate for each individual Brechon-Tubes™ 131 when the actual unique flow rate falls outside the desired unique flow rate. To adjust the flow rate, the PLC 229 may adjust the speed of vane pump 185 with hydraulic motor 195, differential set point of liquid return valve 175, and each one of the PWM valves 230.

As an example, if system 10 includes 30 Brechon-Tubes™ 131 applying NH3 to 30 rows, then there could be 30 different unique adjusted flow rates through each Brechon-Tube™ 131. It should also be noted that the system 10 could function with ball valves or other valves in place of PWM valves 230 but the control of such valves would be limited to on or off and not a setting therebetween thus limiting some control of the flow rate through the Brechon-Tubes™ 131.

In addition to the rate of application information available from the rate controller interface 111, the operator may also monitor overall state of the Anhydrous Ammonia (Nh3) delivery system 10 by referring to the pressure transducer 188 and the temperature transducer 158 shown in FIG. 2. The operator is able, utilizing interface 111 to control the pump speed and each PWM valve 231 if desired but left unadjusted by the operator, system 10 will perform the needed adjustments automatically.

With respect to FIG. 2, Anhydrous Ammonia (Nh3) having passed through the Nh3 Strainer 155 may enter into the bottom of the vapor eliminator 160 from the breakaway coupler 255, the dual delivery hoses 260 and the horizontal pipe 159 shown in FIG. 2. The Anhydrous Ammonia (Nh3) may pass over a vertical baffle 360 (shown in FIG. 16) and may exit the bottom of vapor eliminator 160 and enter the Vane Pump 185. The vapor eliminator 160 may be of sufficient height and circumference to promote the accumulation of any lighter Anhydrous Ammonia (Nh3) vapor at the top of the vapor eliminator 160 where it may be vented to the atmosphere through the gas vent valve 165 and vent hose 170.

Again, referring to FIG. 2, in the event that pressure within the (Nh3) Brechon (Nh3) Distribution Rail 225 increases rapidly, the liquid return valve 175 will redirect the excess flow of liquid Anhydrous Ammonia (Nh3) to an over pressure by pass inlet 161 in the vapor eliminator 160 as seen in FIGS. 2 and 4. For example, pressure in the (Nh3) Brechon (Nh3) Distribution Rail 225 may increase rapidly in response to the flow of several ultra-narrow knives 130 being turned off simultaneously due to the section control feature of the in-cab rate controller interface 111. Liquid Anhydrous Ammonia (Nh3) leaves the bottom of the vapor eliminator 160, then flows through the normally open backup hydraulic shut off valve 205 and enters the vane pump 185. The addition of the liquid return valve 175 in the preferred embodiment facilitates a means for simultaneous control of both pressure and flow rate.

Figure 3:
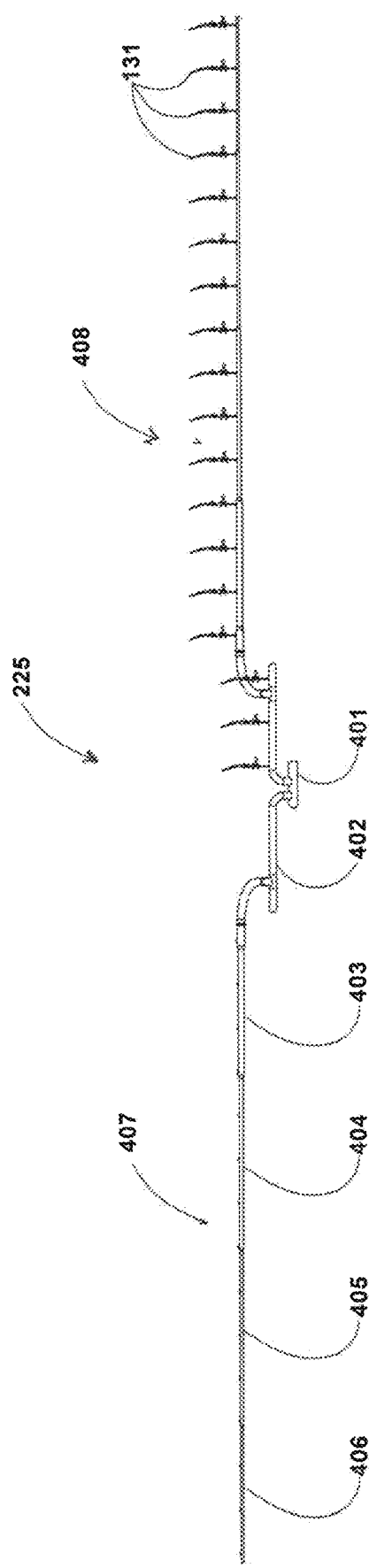
FIG. 3 illustrates an (Nh3) Brechon (Nh3) Distribution Rail of an embodiment of the present invention.

Referring to FIG. 3, the (Nh3) Brechon (Nh3) Distribution Rail 225 may be formed of multiple sections. For example, as generally shown in FIG. 3, the (Nh3) Brechon (Nh3) Distribution Rail 225 may be formed by a first section, a second section 402, a third section 403, a fourth section 404 a fifth section 405 and/or a sixth section 406 (collectively, hereafter referred to as "the sections 401-406").

The first section 401, the second section 402, the third section 403, the fourth section 404, the fifth section 405 and/or the sixth section 406 may have a first diameter, a second diameter, a third diameter, a fourth diameter, a fifth diameter and/or a sixth diameter (collectively, hereafter referred to as "the diameters or diameter"), respectively. The first diameter may be larger than the second diameter, the second diameter may be larger than the third diameter, the third diameter may be larger than the fourth diameter, the fourth diameter may be larger than the fifth diameter and/or the fifth diameter may be larger than the sixth diameter. For example, the first diameter may be two inches, the second diameter may be one and a half inches, the third diameter may be one and a quarter inches, the fourth diameter may be one inch, the fifth diameter may be three fourths of an inch and/or the sixth diameter may be one half of an inch.

The (Nh3) Brechon (Nh3) Distribution Rail 225 and/or one or more of the sections 401-406 may be made from stainless steel. The stainless steel may decrease friction between the liquid Anhydrous Ammonia (Nh3) and/or the (Nh3) Brechon (Nh3) Distribution Rail 225 and/or the one or more of the sections 401-406. The sections 401-406 may be manufactured integrally with each other such that the tube 30 may be manufactured as one piece. Alternatively, the sections 401-306 may be attached to each other to form the (Nh3) Brechon (Nh3) Distribution Rail 225. The (Nh3) Brechon (Nh3) Distribution Rail 225 may be formed by any number of the sections 401-406, and the present invention is not limited to a specific number of the sections 401-406. The present invention is not limited to a specific embodiment of the (Nh3) Brechon (Nh3) Distribution Rail 225, the sections 401-406 or the radii diameters. One readily understands that (Nh3) Brechon (Nh3) Distribution Rail 225 is equally divided in a first half 407 and a second half 408 and the two halves 407 and 408 are symmetrical and may be understood structurally to mirror one another.

As shown in FIG. 2, the plurality of proportional electronic PWM Valves 230 may be connected to the (Nh3) Brechon (Nh3) Distribution Rail 225 and may adjust the flow of liquid Anhydrous Ammonia (Nh3) based on signals generated by the PLC 229. The plurality of venturi style flow meters 231 shown in FIG. 2 may be connected to the (Nh3) Brechon (Nh3) Distribution Rail 225 and may also provide inputs to the PLC 229. The venturi-style flow meters 231 may also be pressure transducers, mass flow meters and/or the like. Moreover, the PLC 229 may adjust the flow of liquid Anhydrous Ammonia (Nh3) to each applicator knife 130 based on GPS information received from the GPS receiver 228, an Anhydrous Ammonia (Nh3) prescription from the rate controller module 110 and the rate controller interface 111 and pressure signals from the venturi-style flow meter 231.

Other forms of row and/or section control may be achieved within the scope of the invention by utilizing either a ball valve and/or a solenoid valve in the place of the proportional electronic PWM Valve 230.

Again referring to FIG. 2, the (Nh3) Brechon (Nh3) Distribution Rail 225 may route liquid Anhydrous Ammonia (Nh3) to the plurality of injection knives 160. When the flow of Anhydrous Ammonia (Nh3) is shut off to the individual injection knives 160 connected to the (Nh3) Brechon (Nh3) Distribution Rail 225, approximately three feet of EVA hose per knife 160 may have any remaining liquid Anhydrous Ammonia (Nh3). This small amount of Anhydrous Ammonia (Nh3) may dissipate quickly without damaging crops and/or creating an inhalation hazard for the operator.

FIG. 4 illustrates the Anhydrous Ammonia Applicator 115 as an embodiment of System 10 as illustrated in FIG. 1. Anhydrous Ammonia (Nh3) liquid and vapor enters horizontal pipe 159 from the dual delivery hoses 260 as shown in FIG. 4. Horizontal pipe 159 may be a 4 inch diameter which permits the Anhydrous Ammonia (NH3) vapor to begin separating from the heavier Anhydrous Ammonia (Nh3) liquid. This now slower velocity Anhydrous Ammonia (NH3) steam enters primary pipe 365 after its temperature is sampled by temperature transmitter 158 and any foreign particles are removed by Nh3 strainer 155. The Anhydrous Ammonia (Nh3) stream then enters the vapor eliminator 160 where the lighter Anhydrous Ammonia (Nh3) vapor rises internally through a multiplicity of perforated assemblies 305, 3400 and 355 as shown in FIG. 17.

Two floats 370 of the vapor eliminator 160 sense the liquid and vapor level, thus opening a gas vent valve 165 to expel the resulting 0.2% flash Anhydrous Ammonia (Nh3) vapor to atmosphere. The heavier Anhydrous Ammonia (Nh3) liquid passes through normally open backup hydraulic shutoff valve 205 and enters the suction of vane pump 185. Vane pump 185 raises the pressure of Anhydrous Ammonia (Nh3) liquid to a pressure which may be seven to ten pounds per square inch greater than the pressure determined from a conversion algorithm which determines the Anhydrous Ammonia (Nh3) pressure at saturation. By adding the additional pressure, the operator can adjust vane pump 185 speed to the slightly higher pressure required to maintain the Anhydrous Ammonia (Nh3) liquid stream in a bubble-free flowing regime.

Upon exiting vane pump 185, the Anhydrous Ammonia (Nh3) liquid enters the run side of a tee 187 which may be 3 inch diameter. A small portion of the Anhydrous Ammonia (Nh3) liquid passes out of the bull of tee 187 where its pressure is sampled by pressure transducer 188. The Anhydrous Ammonia (Nh3) then enters a pressure-sensitive liquid return valve 175. In addition to enabling close positive control over the Anhydrous Ammonia (Nh3) fluid pressure, liquid return valve acts as a primary failsafe device in the event the a multiplicity of PWM valves 230 close simultaneously which could otherwise rupture tubing during an over-pressure event. After exiting liquid return valve 175, the Anhydrous Ammonia (NH3) enters overpressure bypass inlet which may be 2 inch diameter of vapor eliminator 160.

Upon exiting the run of tee 187, the pressurized liquid Anhydrous Ammonia (Nh3) stream enters turbine style flow meter 190 which continuously monitors liquid flow rate and sends these data to the operator in tractor 100 shown in FIG. 1. After exiting turbine style flow meter 190, Anhydrous Ammonia (Nh3) enters Brechon Nh3 Distribution Rail 225. Anhydrous Ammonia (Nh3) liquid then enters a multiplicity of venturi-style flow meters 231, then flows through PWM valves 230 which feed each flexible braided hose 232 and Brechon Tube 131. The carefully metered and controlled Anhydrous Ammonia (Nh3) liquid streams then flow into the earth along each row of corn.

Vapor eliminator 160, vane pump 185 and all aforementioned valves and piping rest upon a John Deere DB90 Bar 125. Rate controller module 110 likewise rests upon the John Deere DB90 Bar 125 and senses the inputs from tractor 100 speed, vane pump 185 rotating speed, turbine style flow meter 190 and venturi-style flow meters 231. After sending this processed data to programmable logic controller 229, programmable logic controller 229 processes this information and compares it to the desired input Anhydrous Ammonia (Nh3) fertilization rate per acre and adjusts vane pump 185 speed and liquid return valve 175 setting to maintain proper fertilization and Anhydrous Ammonia (Nh3) fluid pressure.

Again referring to FIG. 4, pressure transducer 188 and temperature transducer 158 continuously sense both fluid temperature and pressure. These information may be used to find the desired developed pressure by vane pump 185, knowing that, as the pressure of Anhydrous Ammonia (Nh3) liquid is raised within vane pump 185, no change in temperature takes place (an adiabatic process). Therefore, it becomes impossible for vapor to begin to flash inside Brechon Nh3 Distribution Rail 225 unless the Anhydrous Ammonia (Nh3) liquid pressure decays to a pressure less than the fluid pressure at saturation (due to side wall and/or pipe fitting friction). Pressure transducer 188 may also be used to detect on-set of cavitation within vane pump 185. Whenever a bubble of vapor enters vane pump 185 along with a stream of liquid, this vapor bubble collapses internally within vane pump 185 as the pump rotates. This momentary action may cause the pressure of Anhydrous Ammonia (Nh3) liquid at the discharge of vane pump 185 to briefly drop, thus creating a choppy sine wave. Any such formation may be detected by pressure transducer 188, since it is known that the frequency of the sine may be equal to the rotating speed times the number of internal vanes. Sine amplitude may be a function of the percentage of a vane cavity occupied by Anhydrous Ammonia (Nh3) vapor.

System 10 utilizes variable Anhydrous Ammonia (Nh3) feed to each row of corn. This may be accomplished through use of upstream venturi-style flow meter 231 which may be used to detect instantaneous flow rate at each row. The signal from venturi-style flow meter 231 may be sent to programmable logic controller 229 which compares this rate with the input rate calculated from the desired anhydrous fertilization rate per acre. If these two values differ, programmable logic controller 229 moves the port plug within each respective PWM valve 230, either more open or more closed in response.

Figure 8:
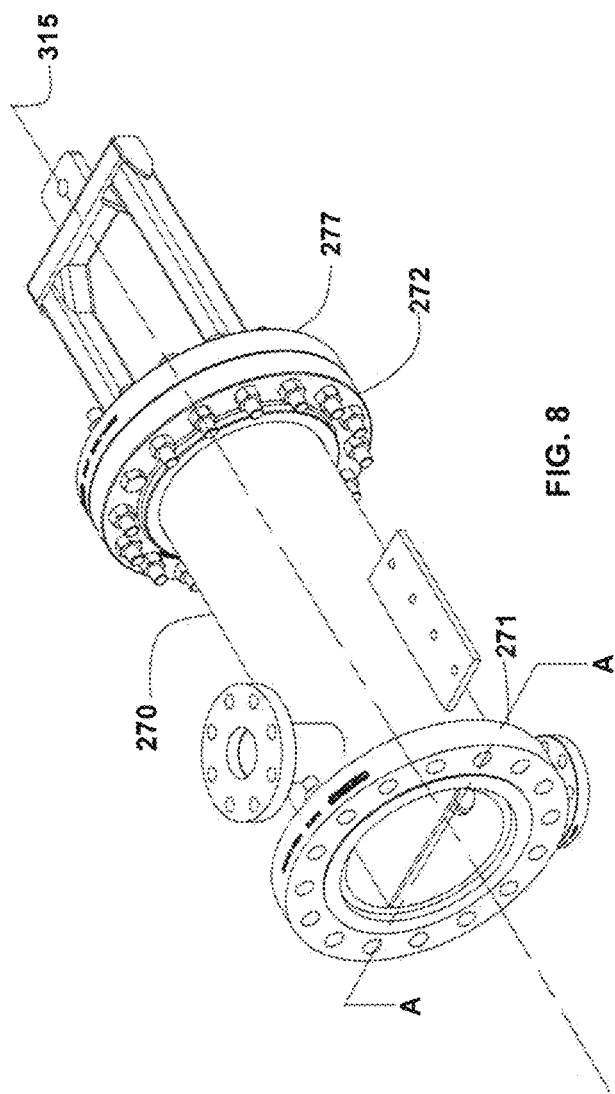
FIG. 8 illustrates an isometric view of a vapor eliminator in an embodiment of the present invention.

Referring to FIGS. 8-17, an embodiment of the vapor eliminator 160 is shown. In particular, FIG. 8 illustrates an isometric view of the vapor eliminator 160 in an embodiment of the present invention. The vapor eliminator 160 has a housing 270, bottom flange 271 and a top end 272. Further, the top end 272 may have a top cap 277. Top cap 277 defines an aperture for receiving a vent valve 165. Top cap 175 is secured by bolts 275. The housing 270 defines an interior 279 as shown in FIG. 16. The housing 270 of the vapor eliminator may be constructed from material, such as, 300 pound steel and/or pipe.

Figure 9:
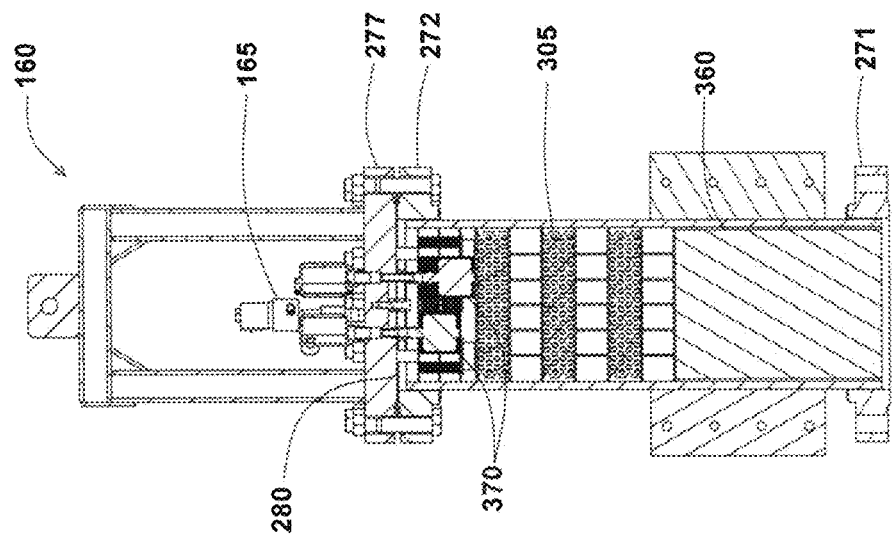
FIG. 9 illustrates a sectional view taken along section line A-A of FIG. 8 of the vapor eliminator in an embodiment of the present invention.

FIG. 9 illustrates a sectional view taken along section line A-A of FIG. 8 of the vapor eliminator 160 in an embodiment of the present invention. A gasket 280 may be arranged between the top end 272 and the top cap 277 and may form a seal there between.

Figure 10:
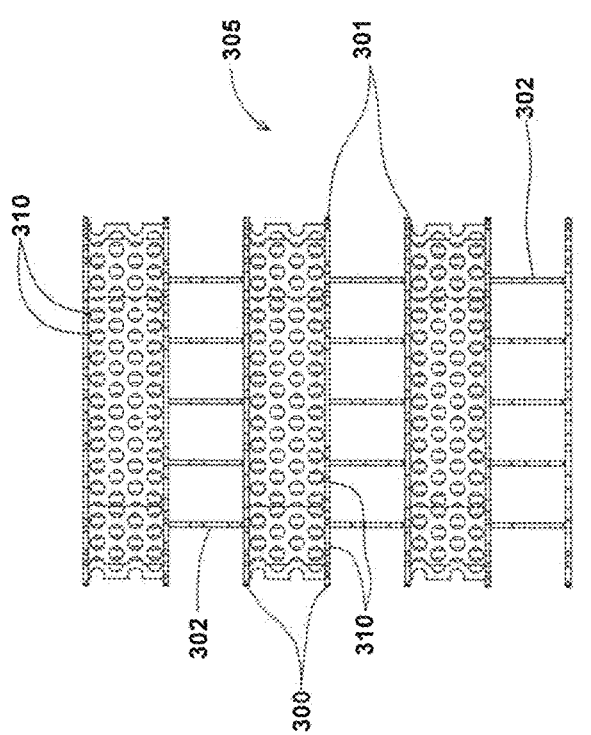
FIG. 10 illustrates a side elevation view of a perforated assembly of a plurality of baffles for use in a vapor eliminator in an embodiment of the present invention.

FIG. 10 illustrates a side elevation view of a perforated assembly 305 including a plurality of perforated baffles 300 for use in the vapor eliminator 160 in an embodiment of the present invention.

Figure 11:
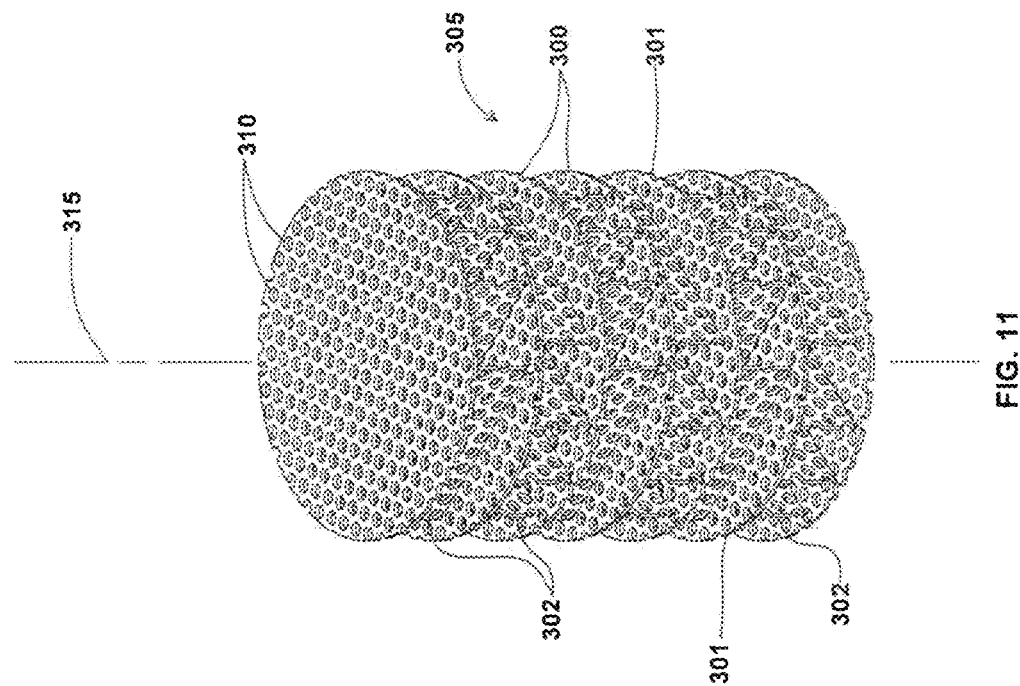
FIG. 11 illustrates an isometric view of the perforated assembly of the plurality of baffles for use in a vapor eliminator in an embodiment of the present invention.

FIG. 11 illustrates an isometric view of the perforated assembly 305 including the plurality of perforated baffles 300 of FIG. 9. In an embodiment, the perforated baffles 300 may be constructed from sheets of material, such as, stainless steel, for example. The perforated baffles 300 may have perforated disks 301 and/or perforated upright baffle plates 302. In an embodiment, each of the perforated disks 301 may have a generally circular shape and may have a horizontal orientation, that is its planar top and bottom extend transverse to a longitudinal axis 315 of the vapor eliminator 160 as shown in FIG. 8. The perforated upright baffle 302 may be connected transversely to the perforated disk 301 in a substantially perpendicular orientation such that a longitudinal axis of the upright baffle extends transversely to the longitudinal axis 315. The perforated disk 301 and/or the perforated upright baffle plates 302 of the perforated baffles 300 may have holes 310 that may be distributed throughout the perforated baffles 300 in a pattern that may be uniform, non-uniform and/or a combination of both. The holes 310 may be arranged on horizontal and/or vertical surfaces of the perforated baffles 300, such as, the perforated disk 301 and/or the perforated upright baffle plates 302, respectively.

As further shown in FIGS. 10 and 11, the perforated disk 301 of the perforated baffles 300 may be arranged in the perforated assembly 305 at angles relative to each other with respect to the longitudinal axis 315 extending through vapor eliminator at, for example, 180 degrees relative to ground. Other angles are also within the scope of this disclosure. Such an arrangement, for example, may maximize misalignment of the holes 310. The perforated assembly 305 of the perforated baffles 300 may have a generally cylindrical shape that may be contained within the interior 279 of the housing 270 shown in FIG. 16 in an embodiment of the present invention.

Further, FIG. 12 illustrates a baffle component 320 that is perforated. and is included in a second baffle assembly 340 (FIG. 14). The baffle component 320 defines holes 310 for use in the vapor eliminator 160. The baffle component 320 includes a perforated disk 321 that may have a generally disc shape. The baffle component 320 may have perforated cylinders 323 that may be attached to the perforated disk 321. Openings 325 may extend through the perforated disk 321. The perforated cylinders 323 may be arranged to encircle the openings 325 in the perforated disk 321. The baffle component 320 may have standoffs 327 attached to the perforated disk 321. The standoffs 327 may be arranged on either side and/or both sides of the perforated disk 321. Further, the baffle component 320 may have a tab 329 attached to the perforated disk 321.

FIG. 13 illustrates an isometric view of a second component 330 that is included in the second baffle assembly 340 for use in the vapor eliminator 160. (FIG. 14). Second component 330 defines holes 310. The second component 330 may have a perforated disk 331 that may have a generally circular disc shape. The second component 330 may have a perforated cylinder 333 that may be attached to the perforated disk 331. Openings 335 may extend through the perforated disk 331. The perforated cylinder 333 may be arranged to encircle one of the openings 335 in the perforated disk 331. The second component 330 may have spacers 337 attached to the perforated disk 321. The spacers 337 may be arranged on one side of the perforated disk 331. The spacers 337 may have springs 338 connected to and/or extending from the spacers 337. Further, the second component 330 may have a tab 339 attached to the perforated disk 331.

FIG. 14 illustrates an isometric view of the assembly 340 including the baffle component 320 and the second component 330 for use in an embodiment of the vapor eliminator 160. As shown, the perforated cylinders 323 and the openings 325 of the baffle component 320 may align with the openings 335 of the second component 330. A center disk 341 that may have a generally circular shape may be arranged between the baffle component 320 and the second component 330. The baffle component 320, the second component 330 and/or the center disk 341 may be connected, for example, by a stich weld. Assembly 340 includes holes 310 found between the baffle component 320, the second component 330 and/or the plate 341. Assembly 340 may be connected between the baffle component 320 and the center disk 341 and between the second component 330 and the center disk 341, for example, by a stich weld.

Further, FIG. 15 illustrates an isometric view of a third baffle assembly 355 for use in vapor eliminator 160. Third assembly 350 includes a pair of baffles 350 that may be in the form of e plates 351 that are perforated and have a generally cylindrical shape. Each plate 351 defines holes 310. Each plate 351 may have openings 356 and a standoff 357 that may be centrally located on the plate 351.

FIG. 16 illustrates an isometric view of the housing 270 of the vapor eliminator 160 in an embodiment of the present invention without the top cap 277 and the bottom cap 273 shown in FIG. 17 for clarity. The vertical baffle 360 may be arranged adjacent to the bottom flange 271 of the housing 270. By vertical it is mean that a longitudinal axis of the vertical plate 360 is paralleled to longitudinal axis 315 of the vapor eliminator 160. Further, the vertical baffle 360 may be located within the interior 279 of the housing 270.

As shown in FIGS. 8, 9, 11, 16 and 17, the vertical baffle 360 may extend within approximately one-third to one-half of the interior 279 of the housing 270, for example. The perforated assembly 305 of the perforated baffles 300 may be arranged adjacent to the top end 272 of the housing 270 and may substantially occupy the approximately one-half of the interior 279 of the housing 270, for example. The housing 270 may also have an primary pipe 365 having a flange 367 that may permit fluid flow into the interior 279 of the housing 270. Further, the housing 270 may have an secondary pipe 368 having a flange 369 that may permit fluid flow into the interior 279 of the housing 270. The primary pipe 365 and the secondary pipe 368 may be located opposite each other on the housing 270. In an embodiment, the primary pipe 365, the secondary pipe 368 and/or the flanges 367, 369 may be constructed of material, such as, 300 pound steel, for example. The holes 310 arranged horizontally and/or vertically in the perforated baffles 300 provide horizontal and vertical baffling within the vapor eliminator 160 to reduce excessive vapor which wastes Anhydrous Ammonia (Nh3) and expense.

Liquid NH3 exits bottom flange 271 to sealingly mate with back up hydraulic shut of valve 205 which in turn sealing mates with vane pump 185. The vane pump 185 with an internal bypass valve for safety may be located under the vapor eliminator 160 to supply Anhydrous Ammonia (Nh3) to the (Nh3) Brechon (Nh3) Distribution Rail 225.

FIG. 17 illustrates an exploded isometric view of the vapor eliminator 160 in an embodiment of the present invention. As shown, the vapor eliminator 160 may have a housing 270 may have a bottom flange 271 and a top end 272 on FIG. 16. The perforated assembly 305 of perforated baffles 300 may be arranged within the interior 279 of the housing 270. The second baffle assembly 340 of the baffle component 320 and the second component 330 shown in FIG. 14 may be located adjacent to the perforated assembly 305 within the interior 279 of the housing 270.

As illustrated in FIGS. 9 and 17, Floats 370 may be located within the interior 279 near the top end 272. The floats 370 may be positioned within the openings 325 of the baffle component 320 and the openings 335 of the second component 330. The floats 370 may travel in a vertical direction relative the housing 270 of the vapor eliminator 160. Further, the top cap 277 may be secured by bolts 275 and the nuts 276 at the top end 272. Top cap 277 defines an outlet for a gas vent 165. (FIG. 9) Adjacent sets of the bolts 275 and the nuts 276 may be arranged to pass through the top end 272 and the top cap 277 in opposite directions. Further, the gas vent valve 165 may be located on the top cap 277 of the vapor eliminator 160. The gas vent valve 165 may be electrically connected to the floats 370 for control and/or monitoring of the operation of the vapor eliminator 160.

As shown in FIGS. 1, 16 and 17, during operation of an embodiment of the system 10, a mixture of liquid and vapor Anhydrous Ammonia (Nh3) may enter the bottom flange 271 of the vapor eliminator 160 through the horizontal pipe 159 then the primary pipe 365, propelled by internal pressure from the tank 235. Upon entering the vapor eliminator 160, the flow of the incoming liquid and vapor Anhydrous Ammonia (Nh3) may be diverted upward by the vertical baffle 360. The liquid flows up over the vertical baffle 360 and then down towards the bottom of the vapor eliminator 160 and through the bottom flange 271 and backup hydraulic shutoff valve 205 and into the vane pump 185.

The gas portion of the mixture may rise to the top end 272 of the vapor eliminator 160. When the amount of vapor reaches a certain point, one of the floats 370 inside the vapor eliminator 160 may open a gas vent valve 165 on the top end 272 of the vapor eliminator 160 that may allow the vapor to escape. As vapor may be released, the liquid level may rise. The floats 370 may be raised by the liquid level to switch off the gas vent valve 165 so that liquid Anhydrous Ammonia (Nh3) may be prevented from being released through the gas vent valve 165 at the top end 272 of the vapor eliminator 160.

The presence of some level of liquid Anhydrous Ammonia (Nh3) within the vapor eliminator 160 may establish a small amount of static pressure. The static pressure may assure that liquid Anhydrous Ammonia (Nh3) leaving the vapor eliminator 160 through the bottom flange 271 may be slightly above saturation pressure and not boiling. This may allow the vane pump 185 to operate without cavitation. This permits flow of pure liquid Anhydrous Ammonia (Nh3) into the vane pump 185 which may enhance application accuracy.

Figure 18:
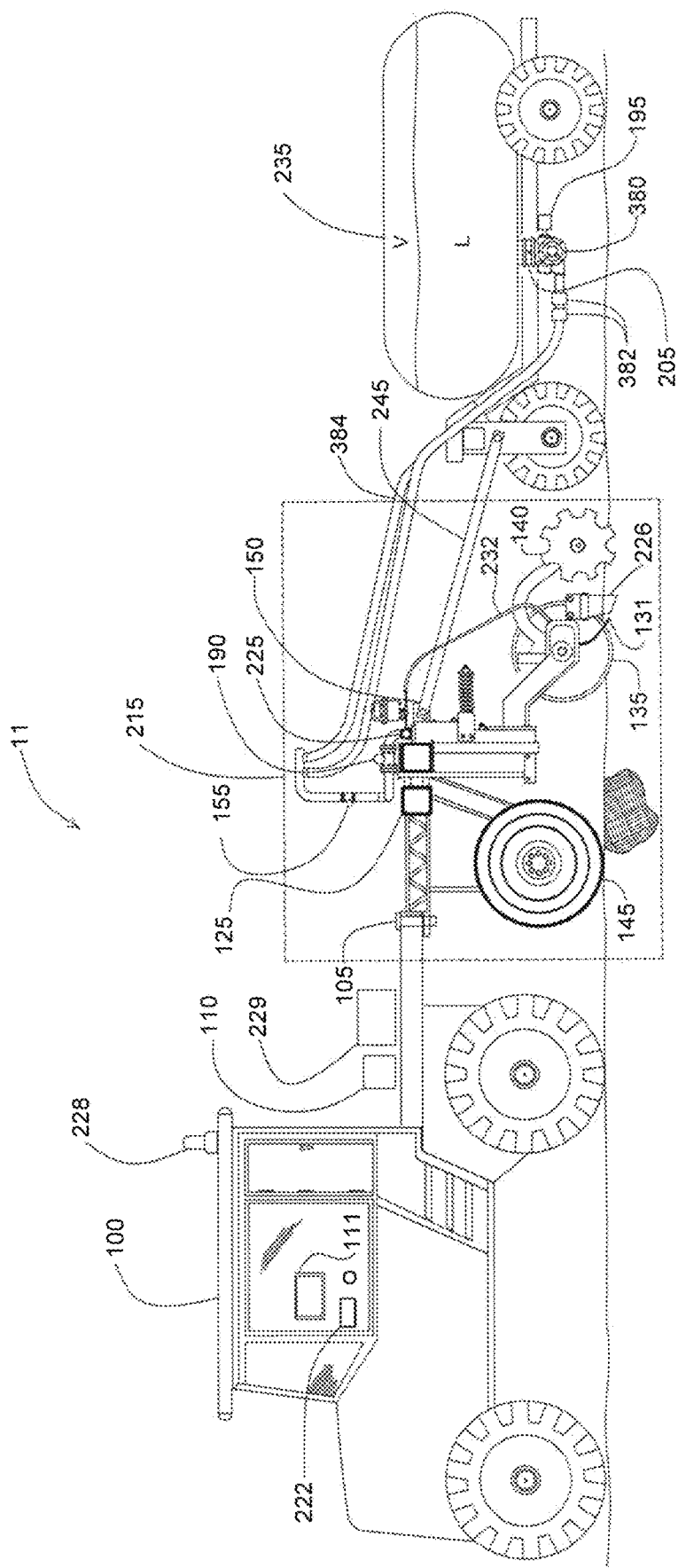
FIG. 18 illustrates another embodiment of the present invention having an Anhydrous Ammonia (Nh3) nurse tank and an Anhydrous Ammonia (Nh3) applicator being pulled behind a tractor.

FIG. 18 illustrates system 11, a second embodiment of the present invention. The system 11 may be pulled behind the tractor 100, a truck and/or the like. The system 11 may have the Anhydrous Ammonia (Nh3) applicator 215 having the John Deere DB90 Bar 125 which may support the plurality of Applicator Knifes 226, coulters 135, Disk Sealers 140 and the (Nh3) Brechon (Nh3) Distribution Rail 225. In this embodiment shown in FIG. 18, the Anhydrous Ammonia (Nh3) applicator 115 215 may operate without the vapor eliminator 160 shown in FIG. 1. A Nh3 nurse tank 235 may be pivotally connected at the rear of the Anhydrous Ammonia (Nh3) applicator 215. The Nh3 nurse tank 235 may be a commercially available pressurized tank, which when filled to capacity, may hold a predetermined quantity of Anhydrous Ammonia (Nh3). The Nh3 nurse tank 235 may contain the Anhydrous Ammonia (Nh3) as a liquid as indicated by reference letter L and/or as a vapor as indicated by reference letter V in FIG. 18.

In the embodiment shown in FIG. 18, the system 11 may have a vane pump 380 attached to the underside of the Nh3 nurse tank 235, for example. The vane pump 380 may be positioned in other locations and/or orientations. Vane pump 185 works together with co-located hydraulic motor 195 to control the flow rate. The vane pump 380 may be connected to valves 382 and/or supply hoses 384 that may access the liquid Anhydrous Ammonia (Nh3) within the Nh3 nurse tank 235. A back up hydraulic shut off valve 205 may be located between the nurse tank 235 and the vane pump 380 and may be controlled by an operator with an E (emergency stop) located in the cab. Valves 382 may be electronic shut off valves controlled by the operator utilizing a one of the interfaces 111, 222 in the cab of the tractor 100. The liquid Anhydrous Ammonia (Nh3) may be pumped directly from the Nh3 nurse tank 235 to the (Nh3) Brechon (Nh3) Distribution Rail 225 via the vane pump 380 without passing through the vapor eliminator 160.

The volume of the liquid Anhydrous Ammonia (Nh3) may be measured with a liquid flowmeter 190 before reaching the (Nh3) Brechon (Nh3) Distribution Rail 225. The liquid flowmeter 190 may provide Anhydrous Ammonia (Nh3) volume data to the PLC 229, the in-cab rate controller interface 111 and/or the rate controller module 110. The reducing diameter of the sections 401-406 from the center to the ends of the (Nh3) Brechon (Nh3) Distribution Rail 225 may require maintaining a minimum pressure to maintain a liquid Anhydrous Ammonia (Nh3) natural state from the vane pump 380 throughout the (Nh3) Brechon (Nh3) Distribution Rail 225. This is important to prevent liquid Anhydrous Ammonia (Nh3) from vaporizing. This method prevents the liquid flowmeter 190 from giving false information to the in-cab rate controller interface 111 and/or the rate controller module 110 on (Nh3) Brechon (Nh3) Distribution Rail 225.

Figure 19:
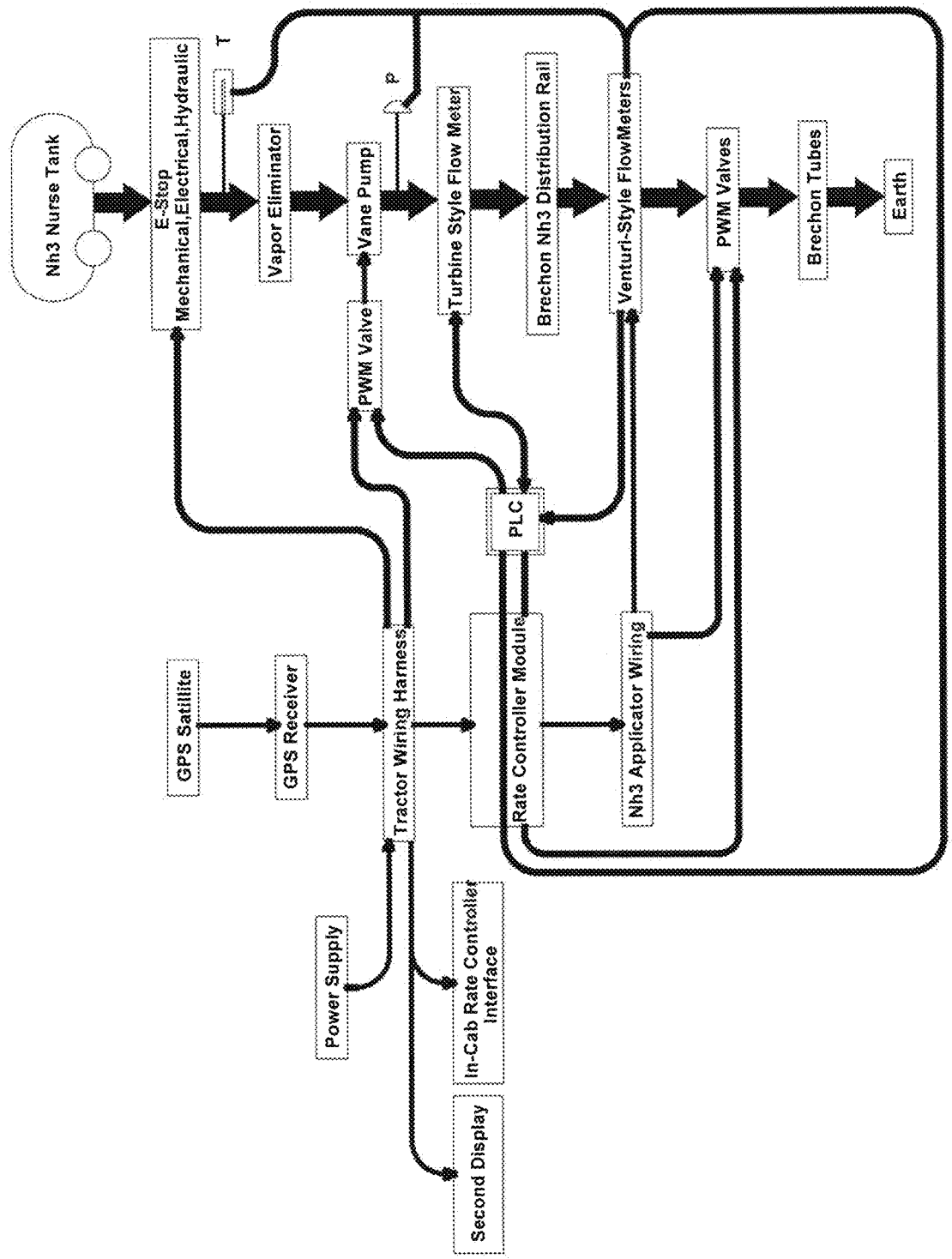
FIG. 19 illustrates a block control and wiring diagram of an embodiment of the present invention.
Figure 20:
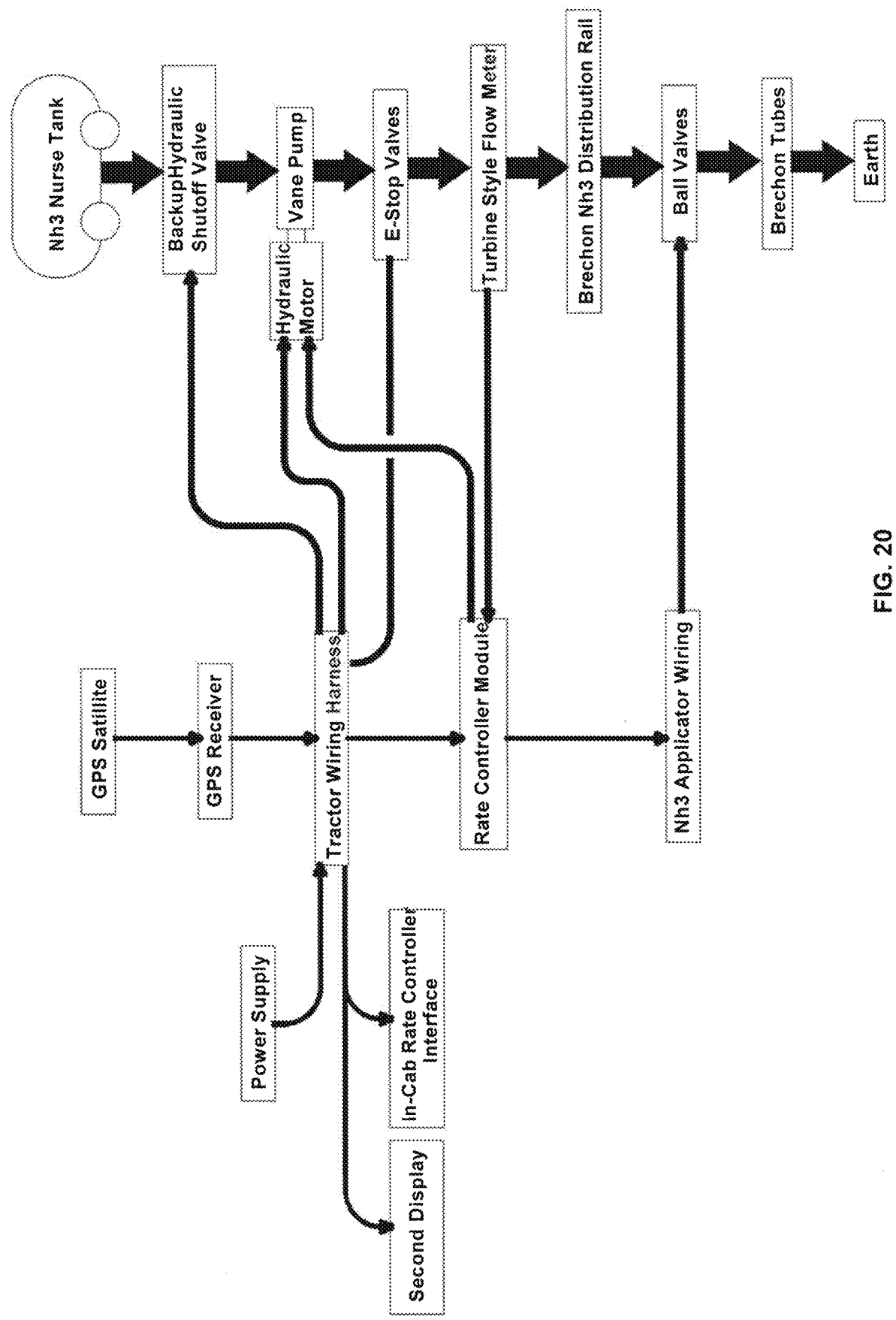
FIG. 20 illustrates a block control and wiring diagram of another embodiment of the present invention.

FIGS. 19 and 20 illustrate block control and wiring diagrams for two embodiments of the present invention. For example, FIG. 19 illustrates a block control and wiring diagram that may correspond to the system 10 shown in FIG. 1. FIG. 20 illustrates a block control and wiring diagram that may correspond to the system 11 shown in FIG. 18.

FIGS. 19 and 20 show thin connecting lines between the blocks to illustrate connectivity, control, communications, power and/or the like. Further, FIGS. 19 and 20 show shaded arrows between the blocks to illustrate flow of the Anhydrous Ammonia (Nh3).

FIG. 19 illustrates a block control and wiring diagram that may correspond to the system 10 shown in FIG. 1. Anhydrous Ammonia (Nh3) flows from the NH3 nurse tank 235 then though the E Stop emergency shut off valves 200 and 205. A temperature transducer 158 is shown with the letter T which senses liquid temperature and converts these data to units of absolute pressure through an algorithm. Liquid and vapor ammonia (NH3) enter vapor eliminator 160 where the lighter vapor is vented to atmosphere and heavier liquid enters vane pump 185 where its pressure is raised to a pressure slightly above the absolute pressure as calculated by the temperature transducer 158 and as controlled by pressure transducer 188 as shown with a letter P. Pressurized Anhydrous ammonia (Nh3) flows through turbine-style flow meter 190 which accurately records flow rate of anhydrous ammonia (Nh3) liquid for fertilization. Liquid then enters Brechon Nh3 Distribution Rail which feeds individual venturi-style flow meters 231 and PWM valves 230 then through each Brechon Tube™ 131 and into the field.

FIG. 20 illustrates a block control and wiring diagram that may correspond to the system 11 shown in FIG. 18. Anhydrous Ammonia (Nh3) flows from the NH3 nurse tank 235 though the E Stop emergency shut off valves 200 and 205 and into vane pump 380 where its pressure is raised to a pressure slightly above gauge pressure. Pressurized Anhydrous ammonia (Nh3) then flows through turbine-style flow meter 190 which accurately records flow rate of anhydrous ammonia (Nh3) liquid for fertilization. Liquid then enters Brechon Nh3 Distribution Rail 225 which feeds individual ball valves 227 (FIG. 21), then through each Brechon Tube™ 131 and into the field for fertilization. Opening and closing of ball valves is accomplished by the tractor operator.

The system 11 may have the vane pump 380 situated under the tank 235. The configuration with the vane pump 380 under the tank 235 may permit high volume Brechon (Nh3) Distribution Rails 225 with widths, such as, ninety feet to 154 feet and greater. Such widths may extend beyond the norm in the industry to operate with larger equipment and/or Anhydrous Ammonia (Nh3) applicators, more precise application and/or application speeds that are not influenced by cold weather. This system 11 operates without the vapor eliminator 160. The pressure of the Anhydrous Ammonia (Nh3) from the tank 235 to the (Nh3) Brechon (Nh3) Distribution Rail 225 may be maintained by the vane pump 380 with hydraulic motor 195 and/or monitored by the liquid flow meter 190.

Figure 22:
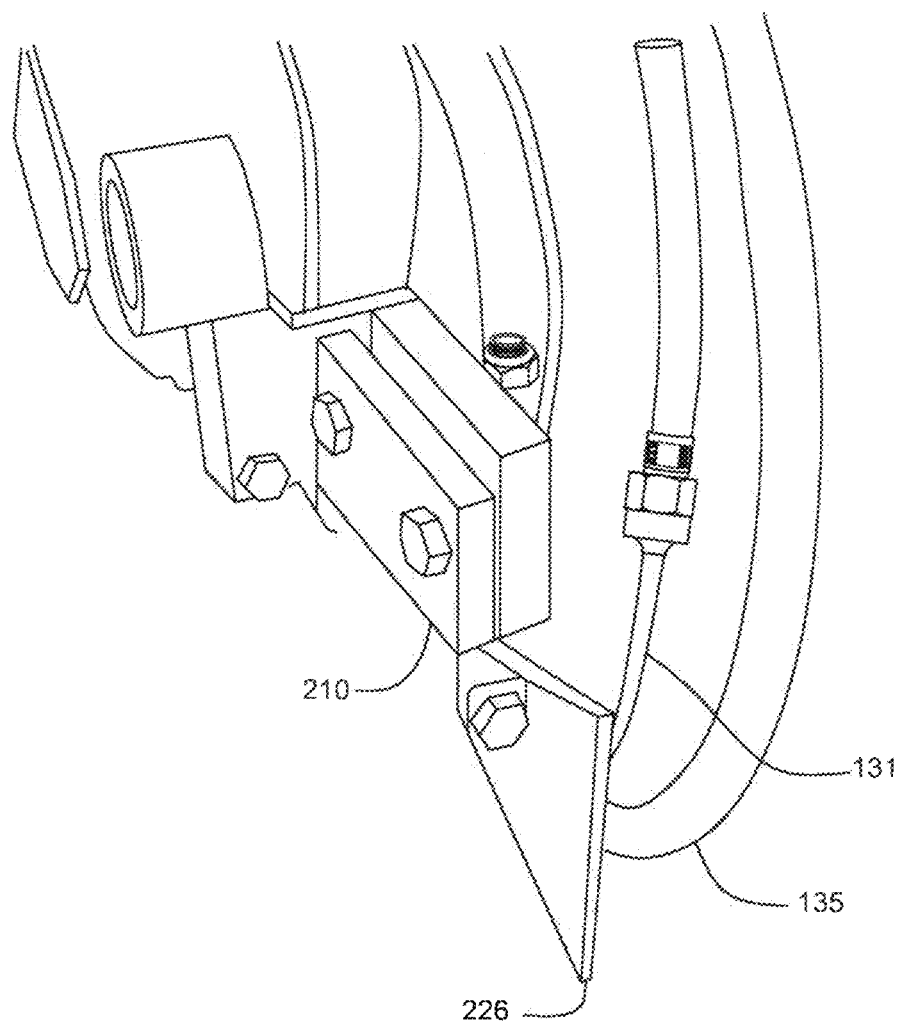
FIG. 22 illustrates an isometric view of Brechon Tube™ 131 as it passes between Scraper Bracket 210 and Coulter 135.

FIGS. 18, 21 and 22 illustrate System 11. The system 11 may be pulled behind a tractor 100, a truck and/or the like. In an embodiment, the system 11 may have an Anhydrous Ammonia (Nh3) applicator 215 resting upon a John Deere DB90 Bar 125 which may support a plurality of knives 226, coulters 135, closing disks 140, an (Nh3) Brechon (Nh3) Distribution Rail 225. The Anhydrous Ammonia (Nh3) applicator 215 may be supported by a plurality of Tire and Rim 145 and may have a tongue 245 that may be pivotally connected to a tractor hitch 105.

The applicator 215 may pull a the Nh3 nurse tank 235 having a tongue 245 that may be pivotally connected to an applicator hitch 150 on the rear of the Anhydrous Ammonia (Nh3) applicator 115. The Nh3 nurse tank 235 may be a commercially available pressurized tank, which when filled to capacity, may hold a predetermined quantity of Anhydrous Ammonia (Nh3). The Nh3 nurse tank 235 may contain the Anhydrous Ammonia (Nh3) as a liquid as indicated by reference letter L and/or as a vapor as indicated by reference letter V in FIG. 1. The Nh3 nurse tank 235 may be supported by a plurality of Tire and Rim 240.

System 10 and System 11 primarily differ from each other in that vapor eliminator 160 in System 10 is eliminated. System 11 locates vane pump 380 to the underside of nurse tank 235. System 11 is made possible by locating vane pump 380 in such a way as to pressurize all Anhydrous Ammonia (Nh3) liquid piping from the discharge side of vane pump 380 through the turbine style flow meter 190 and through the entire length of Brechon Nh3 Distribution Rail 225 up to each Brechon tube 131. In this fashion, vapor eliminator 160 becomes unnecessary in System 11 because all piping downstream of vane pump 380 including Brechon Nh3 Distribution Rail 225 is held under a pressure slightly in excess of Anhydrous Ammonia (Nh3) saturation pressure by vane pump 380.

Refer now to FIG. 21. Pressurized Anhydrous Ammonia (Nh3) liquid may flow through the dual distribution hoses 260 and enters horizontal pipe 159. Horizontal pipe 159 may connect to Nh3 strainer 155 to remove any foreign particles. Outlet of Nh3 strainer may connect to turbine style flow meter 190 which records instantaneous Anhydrous Ammonia (Nh3) liquid flow rate. This signal is sent to second display 222 in the cab of tractor 100 as seen in FIG. 18. Pressurized Anhydrous Ammonia (Nh3) liquid may flow into each open ball valve 227 then may flow to flexible braided hose 232 which connects to each Brechon Tube 131, then may flow into the groove cut into the earth by coulter 135. Knife 226 cuts the stream of now atmospheric pressure Anhydrous Ammonia (Nh3) into the soil and closing disks 140 fold earth over the groove cut by coulter 135. Brechon Tube 131 may be installed between Scraper Bracket 210, Knife 226 and Coulter 135 and may be secured in place by a stitch weld to the back of Scraper Bracket 210. FIG. 22 is an isometric view of the installation of Brechon Tube 131 between Coulter 135, Scraper Bracket 210 and Knife 226 as an embodiment of the alternate System 11.

Accordingly, the system 11 utilizing PLC 229 is similar in most respects to system 10. As already described, the system 11, does not have a similar temperature transmitter 148 or pressure transducer 188. Further its ball valves 227 are either on or off. The transition of the ball valves 227 from open to closed or closed to open should not be considered as a state of the valve. In other words, there no intermediate state between open and close for the ball valves 227 (unlike PWM valves 230 of system 10).

Thus, much like as in system 10, PLC 229 takes into account the geographic location of the field and the historical data of that fields soil in addition to the number of rows to which the NH3 is to be applied and the speed of which the tractor 100 will apply the NH3 to derive a desired flow rate through each Brechon-Tube™ 131 of NH3 to be applied to the field. Once the desired flow rate is calculated with the PLC 229, then the PLC 229 controls the speed of vane pump 380 with hydraulic motor 195 and the opening of ball valves 227 to set a desired flow rate that is the same through each one of the Brechon-Tubes™ 131 (unlike system 10 where the each Brechon Tube™ may have its own individual or unique flow rate.)

During actual application of the NH3 using system 11, PLC 229 receives input from vane pump 380 and hydraulic motor 195 (speed), turbine style flow meter 190 (flow rate), ball valves 227 (open/closed) and GPS receiver 228 for geographic location and thus tractor 100 speed. From these inputs, PLC 229 is able to automatically, that is without an operator input, adjust the desired flow rate through all the Brechon-Tubes™ 131 when the actual flow rate falls outside the desired flow rate by adjusting the hydraulic motor 195 and speed of the pump 185. In other words, in system 11, if there are 30 Brechon-Tubes™ 131 applying NH3 to 30 rows, then there actual flow rate through each Brechon-Tube™ should be the same. The operator is also able to manually adjust the speed of the pump 380 and turn ball individual ball valves 227 on or off as desired from one of the interface controllers 111, 222 in the cab of the tractor 100 if so desired.

As should now be apparent from the foregoing, prior systems in the application of anhydrous ammonia to a field involved a manifold, either Modified Impellicone manifold, PWM manifold or a Vertical Dam manifold. The function of these manifolds is to mix and evenly distribute a two-phase mixture of both liquid and vapor ammonia to each row undergoing fertilization. However, all attempts to accomplish this process involve some uneven distribution between rows, depending upon the rate of application, the temperature of the Nh3 and the type of manifold employed. Some prior systems also incorporate a liquid subcooling heat exchanger in order to reduce the very large volume quantities of ammonia vapor, thereby reducing the variations in Nh3 mass flow between each row. The downside to liquid subcooling using a heat exchanger is that roughly 10% of the total quantity of Nh3 applied is required for this subcooling process and this quantity increases the variation in row distribution previously mentioned. There are two methods of achieving a subcooled liquid state of a flowing anhydrous stream, to wit, remove heat from the flowing stream while leaving pressure constant (discussed above) or raise its pressure (e.g. with a mechanical drive pump) while leaving its temperature constant.

Both methods can achieve an identical state point. However, according to embodiments of the present invention, when a distribution rail is fitted with a multiplicity of identical Brechon Tubes™, each Brechon Tubes™ having an upstream automatic liquid shut-off valve, then all upstream NH3 in the distribution rail tubing is held in a liquid state only without the presence of any vapor whatsoever. This assures flow uniformity. This uniformity is achievable because each Brechon Tube is identical and has identical pressure characteristics, each Brechon Tube™ is located at the point of NH3 injection, NH3 flow upstream of each Brechon Tube™ is held in a liquid state by employing an NH3 pump, and pressure and temperature of the flowing NH3 is continuously monitored by on-board controls, with the data being converted to a known saturation pressure. When saturation pressure is known, pump speed can be slightly increased by software predetermined speed increase. The embodiments described herein provides advantage over prior systems and methods, at least in part, because the Brechon Tubes™ exhibit a very large pressure drop (high Reynolds number) which is overcome by a mechanical drive pump, and the Brechon Tubes™ are located at each row. This assures all upstream tubing conveying NH3 to each point of injection will be held in a single liquid state only.

Moreover, the present invention is not limited to the specific arrangement of the components illustrated in the figures. It should be understood that various changes and modifications to the presently preferred embodiments described herein will be apparent to those having ordinary skill in the art. Such changes and modifications may be made without departing from the spirit and scope of the present invention and without diminishing its attendant advantages. It is, therefore, intended that such changes and modifications be covered by the appended claims. All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention. Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An applicator for applying $NH_3$ to an agricultural field comprising:
   a distribution rail for receiving and out letting a flow of the $NH_3$;
   wherein the distribution rail has a decreasing inner diameter from an inlet of the distribution rail to distal ends of the distribution rail.

2. The applicator of claim 1, wherein the decreasing inner diameter is a stepped decrease.

3. The applicator of claim 1, further comprising:
   a first flow meter upstream of the distribution rail for measuring an actual flow rate of a flow of the $NH_3$;
   a plurality of valves downstream of the distribution rail;
   a plurality of delivery tubes, each respective one of the plurality of delivery tubes in series with and downstream of a respective one of each of the plurality of valves;
   wherein the plurality of valves are configured to be controlled to provide a desired flow rate of the flow through the plurality of delivery tubes.

4. The applicator of claim 3, wherein the plurality of valves are ball valves.

5. The applicator of claim 4, wherein the ball valves are configured to be controlled automatically to an open state and a closed state.

6. The applicator of claim 3, including a coulter, knife and closing disc for each one of the plurality of delivery tubes, the coulter configured to cut a groove in the agricultural field as the applicator is pulled over the agricultural field, each one of the delivery tubes configured to deliver the flow into the groove, the knife configured to cut the flow of $NH_3$ into a soil of the agricultural field.

7. The applicator of claim 6, wherein each one of the delivery tubes is located between a scraper bracket and the coulter.

8. The applicator of claim 3, wherein each one of the delivery tubes and the distribution rail are entirely stainless steel.

9. The applicator of claim 1, wherein the applicator includes upstream of the distribution rail, a vapor eliminator and a liquid return valve, the liquid return valve configured to return a portion of the flow from the vapor eliminator to an inlet of the vapor eliminator.

10. The applicator of claim 9, further comprising a positive displacement pump located between the vapor eliminator and the distribution rail.

11. The applicator of claim 10, further comprising:
a plurality of valves downstream of the distribution rail;
a plurality of delivery tubes, each respective one of the plurality of delivery tubes in series with and downstream of a respective one of each of the plurality of valves;
wherein the plurality of valves are configured to be controlled to provide a desired flow rate unique to each one of plurality of valves.

12. The applicator of claim 11, wherein each one of the plurality of valves are located respectively between a one of a plurality of delivery flow meters downstream of the distribution rail and a one of a plurality of delivery tubes downstream of the distribution rail.

13. The applicator of claim 12, wherein each one of the plurality of valves is a pulse width modulation valve, each one of the pulse width modulation valves configured to be automatically adjusted with a controller to provide an actual flow rate unique to each one of the plurality of valves.

14. The applicator of claim 12, wherein each one of the plurality of valves, the pump, and a differential set point of a liquid relief valve are configured to be automatically adjusted with a controller to provide an actual flow rate unique to each one of the plurality of valves.

15. The applicator of claim 12, including a coulter, knife and closing disc for each one of the plurality of delivery tubes, the coulter configured to cut a groove in the agricultural field as the applicator is pulled over the agricultural field, each one of the delivery tubes configured to deliver the flow into the groove, the knife configured to cut the flow of NH into the soil of the agricultural field.

16. The applicator of claim 15, wherein each one of the delivery tubes terminates under a heel of the knife, the heel configured to divide the flow in half and apply each half of the flow at approximately 90 degrees to sides of the groove.

17. An applicator for applying $NH_3$ to an agricultural field comprising:
a distribution rail for receiving and out letting a flow of the $NH_3$;
wherein the distribution rail has a decreasing inner diameter from an inlet of the distribution rail to distal ends of the distribution rail;
wherein the applicator includes upstream of the distribution rail, a vapor eliminator and a liquid return valve, the liquid return valve configured to return a portion of the flow from the vapor eliminator to an inlet of the vapor eliminator;
the vapor eliminator comprising:
a housing defining a central cavity, an inlet and an outlet for the flow;
a plurality of horizontal and vertical baffles arranged in the central cavity to separate vapor from liquid in the flow;
a gas vent for out letting the vapor, and
an overpressure bypass inlet fluidly connected to an outlet of a liquid relief valve.

18. The applicator of claim 17, wherein the plurality of horizontal and vertical baffles includes at least one non perforated baffle and a plurality of perforated baffles.

19. A system for applying $NH_3$ to an agricultural field, the system comprising:
an applicator for applying $NH_3$ to an agricultural field comprising:
a distribution rail for receiving and out letting a flow of the $NH_3$;
wherein the distribution rail has a decreasing inner diameter from an inlet of the distribution rail to distal ends of the distribution rail;
a vehicle for pulling the applicator over the agricultural field;
a nurse tank of $NH_3$ in fluid connection with the applicator;
a pump and hydraulic motor fluidly connected between the nurse tank and the applicator;
a controller for controlling a plurality of valves, a positive displacement pump, and the hydraulic motor.

20. The system of claim 19, wherein the controller is configured to open the plurality of valves and set a speed of the pump to provide an identical desired flow rate through each one of a plurality of delivery tubes.

21. The system of claim 20, wherein the controller is configured to receive an actual flow rate from a first flow meter, the speed of the pump and adjust the speed of the positive displacement pump to adjust the actual flow rate when the actual flow rate falls outside the desired flow rate.

22. The system of claim 19, wherein the applicator includes upstream of the distribution rail, a vapor eliminator and a liquid return valve, the liquid return valve configured to return a portion of the flow from the vapor eliminator to an inlet of the vapor eliminator.

23. The system of claim 22, further comprising:
a plurality of valves downstream of the distribution rail;
a plurality of delivery tubes in series with and downstream of a respective one of each of the plurality of valves;
wherein the plurality of valves are configured to be controlled to provide a desired flow rate unique to each one of plurality of valves.

24. The system of claim 23, wherein the controller is configured to set a state of the plurality of valves, set a speed of the positive displacement pump, and set a differential set point of a liquid relief valve to provide the desired flow rate.

25. The system of claim 23, wherein the controller is configured to receive an actual flow rate from a first flow meter, a speed of the pump, the actual flow rate through each one of the plurality of valves, and adjust the speed of the pump, a differential set point, and a state of each one of the plurality of valves to adjust the actual flow rate though each one of the plurality of valves when the actual flow rate falls outside the desired flow rate.

26. The system of claim 25 wherein the applicator includes a temperature sensor at the inlet of the vapor eliminator and a pressure transducer downstream of the vapor eliminator; wherein the adjusted flow rate set by the controller is further based on receipt of a sensed measurement from the temperature sensor and a sensed pressure received from pressure transducer.

27. A method for applying anhydrous ammonia, $NH_3$, to a plurality of crop rows in a field, the method comprising the steps of:
determining a desired uniform rate of $NH_3$ to apply to the plurality of crop rows with an $NH_3$ applicator comprising a flow meter upstream of a distribution rail and a plurality of valves in series with a respective one of a plurality of delivery tubes downstream of the distribution rail, and wherein the distribution rail has a decreasing diameter from an inlet to distal ends of the distribution rail;
calculating a desired flow rate of $NH_3$ through the plurality of delivery tubes;

setting a speed of a pump fluidly connected to the applicator to apply the desired flow rate;
applying the $NH_3$ with the applicator;
sensing an actual application rate at the flow meter;
comparing the desired uniform application rate with the actual application rate;
adjusting at least the speed of the pump to adjust the actual application rate when the actual application rate falls outside the desired application rate.

* * * * *

UNITED STATES PATENT AND TRADEMARK OFFICE
CERTIFICATE OF CORRECTION

| | |
|---|---|
| PATENT NO. | : 10,925,209 B2 |
| APPLICATION NO. | : 15/818516 |
| DATED | : February 23, 2021 |
| INVENTOR(S) | : Gerald A. Brechon |

It is certified that error appears in the above-identified patent and that said Letters Patent is hereby corrected as shown below:

In the Claims

Claim 15, Line 7, reads "NH into the soil of the agricultural field." and should read --$NH_3$ into the soil of the agricultural field.--

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*